United States Patent
Hor-Lao et al.

(10) Patent No.: US 10,433,363 B2
(45) Date of Patent: Oct. 1, 2019

(54) DYNAMICALLY INITIATING CHANGES TO A CONNECTIVITY CONFIGURATION BY A USER DEVICE

(71) Applicant: Motorola Mobility LLC, Chicago, IL (US)

(72) Inventors: Mary Khun Hor-Lao, Chicago, IL (US); Ranjeet Gupta, Naperville, IL (US)

(73) Assignee: Motorola Mobility LLC, Chicago, IL (US)

( * ) Notice: Subject to any disclaimer, the term of this patent is extended or adjusted under 35 U.S.C. 154(b) by 166 days.

(21) Appl. No.: 15/656,881

(22) Filed: Jul. 21, 2017

(65) Prior Publication Data

US 2019/0029056 A1    Jan. 24, 2019

(51) Int. Cl.
| | | |
|---|---|---|
| H04B 7/04 | (2017.01) | |
| H04W 76/20 | (2018.01) | |
| H01Q 25/04 | (2006.01) | |
| H04W 88/08 | (2009.01) | |

(52) U.S. Cl.
CPC ............ H04W 76/20 (2018.02); H01Q 25/04 (2013.01); H04B 7/04 (2013.01); H04W 88/08 (2013.01)

(58) Field of Classification Search
None
See application file for complete search history.

(56) References Cited

U.S. PATENT DOCUMENTS

| | | | |
|---|---|---|---|
| 8,965,411 B1 | 2/2015 | Busch-Sorensen et al. | |
| 10,051,506 B1 | 8/2018 | Mistry et al. | |
| 10,285,216 B2 | 5/2019 | Hor-Lao et al. | |
| 90,165,838 | 5/2019 | Hor-Lao et al. | |
| 10,382,105 B2 | 8/2019 | Hor-Lao et al. | |
| 90,239,275 | 8/2019 | Hor-Lao et al. | |
| 2008/0247370 A1 | 10/2008 | Gu et al. | |
| 2010/0009674 A1* | 1/2010 | Sapkota | H04W 36/36 455/426.1 |
| 2010/0234026 A1 | 9/2010 | Tenny et al. | |
| 2012/0163307 A1* | 6/2012 | Wang | H04W 72/1215 370/329 |
| 2013/0212663 A1 | 8/2013 | Edge et al. | |
| 2014/0225775 A1* | 8/2014 | Clevorn | H01Q 3/34 342/372 |

(Continued)

OTHER PUBLICATIONS

"Non-Final Office Action", U.S. Appl. No. 15/826,311, dated Dec. 14, 2018, 7 pages.

(Continued)

*Primary Examiner* — Ajit Patel
(74) *Attorney, Agent, or Firm* — SBMC

(57) ABSTRACT

Various embodiments provide a user device that dynamically initiates a change to its connectivity configuration. Some embodiments of the user device determine its current connectivity configuration and, based upon its current connectivity configuration, obtains one or more metrics associated with its current operating environment and/or current operating configuration. In turn, the user devices analyzes the metrics to determine whether to alter its current connectivity configuration. Responsive to the analysis, some embodiments modify the current connectivity configuration by modifying a connection type to a wireless networking device.

20 Claims, 12 Drawing Sheets

(56) References Cited

U.S. PATENT DOCUMENTS

| | | | | |
|---|---|---|---|---|
| 2014/0274200 | A1* | 9/2014 | Olson | H04B 1/3877 455/552.1 |
| 2015/0105059 | A1* | 4/2015 | Lamberton | H04L 63/102 455/418 |
| 2016/0021664 | A1 | 1/2016 | Chou | |
| 2016/0338121 | A1 | 11/2016 | Wietfeldt et al. | |
| 2017/0041812 | A1 | 2/2017 | Iuzzolino et al. | |
| 2017/0070923 | A1* | 3/2017 | Li | H04W 36/0066 |
| 2017/0188298 | A1* | 6/2017 | Pattan | H04W 76/11 |
| 2019/0029055 | A1 | 1/2019 | Hor-Lao et al. | |

OTHER PUBLICATIONS

"Non-Final Office Action", U.S. Appl. No. 15/656,722, dated Nov. 29, 2018, 9 pages.

Khalil,"Differentiated Multiuser Resource Allocation Scheme for Multiband UWB Systems", Jul. 22, 2009, 6 pages.

Lakshmanan,"Practical Beamforming based on RSSI Measurements using Off-the-shelf Wireless Clients", Nov. 6, 2009, 7 pages.

Lee,"Group-Oriented Multiuser Beamforming-OFDM for Different QoS Requirement", Jun. 2011, 3 pages.

Pefkianakis,"CMES: Collaborative Energy Save for MIMO 802.11 Wireless Networks", Oct. 2013, 10 pages.

Riggio,"Interference Management in Software-Defined Mobile Networks", May 2015, 7 pages.

Sun,"Bringing Mobility-Awareness to WLANs using HY Layer Information", Dec. 2, 2014, pp. 53-65.

Yu,"Power Management of MIMO Network Inter-faces on Mobile Systems", Jun. 23, 2011, 14 pages.

"Corrected Notice of Allowance", U.S. Appl. No. 15/656,722, dated Apr. 8, 2019, 2 pages.

"Notice of Allowance", U.S. Appl. No. 15/656,722, dated Mar. 21, 2019, 5 pages.

"Notice of Allowance", U.S. Appl. No. 15/826,311, dated Mar. 29, 2019, 9 pages.

* cited by examiner

DYNAMICALLY INITIATING CHANGES TO A CONNECTIVITY CONFIGURATION BY A USER DEVICE

BACKGROUND

Wireless networking devices, such as access points, provide user devices with access to a wired network. To connect with the wired network, a user device establishes a wireless connection to the wireless networking device. When the wireless networking device supports multiple different wireless connection types, multiple user devices can simultaneously connect to the wireless networking device via different wireless connection types. However, variations between user devices (e.g., operating environments, active applications, locations, etc.) can affect the efficiency of how well data transfers over a respective wireless connection relative to different wireless connection types. As an added complexity, these variations associated with a user device can dynamically change over the lifespan of a wireless connection. Thus, the connection type used to wirelessly connect a user device to a wireless networking device may not utilize the wireless networking device to its full potential, or address the changing needs of a respective user device.

BRIEF DESCRIPTION OF THE DRAWINGS

Embodiments for dynamically altering wireless connection types in a wireless local area network (Wi-Fi) environment are described with reference to the following Figures. The same numbers may be used throughout to reference like features and components that are shown in the Figures.

DETAILED DESCRIPTION

Overview

Figure 1:
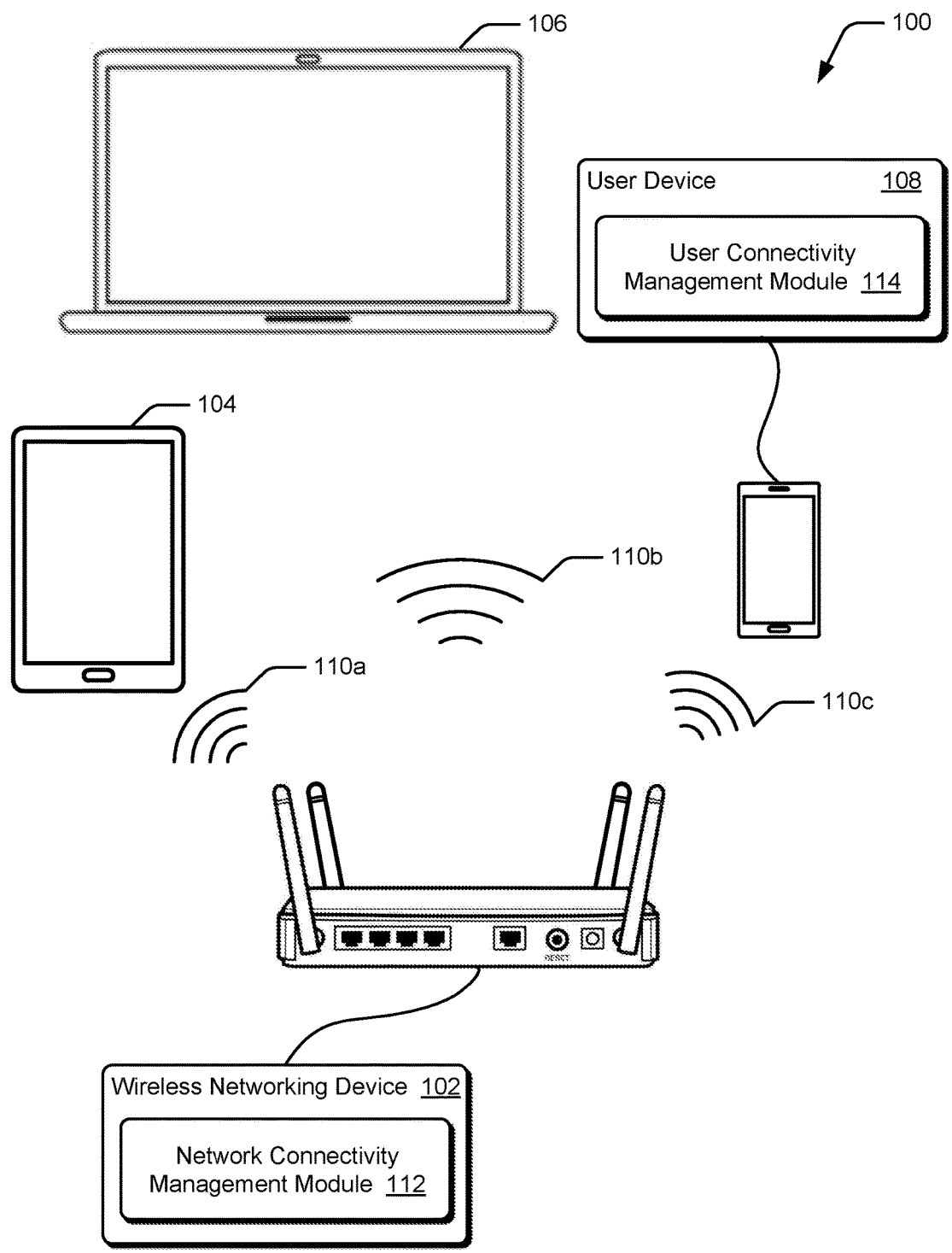
FIG. 1 illustrates an example operating environment in accordance with one or more embodiments.

Various embodiments provide dynamic alterations to a connectivity configuration associated with a wireless networking device. The wireless networking device maintains multiple wireless connections with multiple user devices using a combination of beam-formed wireless signals and omnidirectional wireless signals. The wireless network device generates a list of connected or associated user devices that are capable of beam-formed wireless communications, and obtains metrics for each respective user device. Among other things, the metrics identify a current operating environment and/or operating performance associated with the respective user device. The wireless networking device prioritizes the list based upon the respective metrics, and determines whether a current connectivity configuration differs from the prioritization. In some embodiments, the wireless networking device governs the prioritization using a delay or hysteresis to avoid extraneous reconfigurations as further described herein. Responsive to determining a difference, the wireless networking device can dynamically reconfigure the connectivity configuration by altering a connection type associated with at least one user device.

Alternately or additionally, in at least some embodiments, a user device dynamically initiates a change to its connectivity configuration. Some embodiments of the user device determine its current connectivity configuration and, based upon its current connectivity configuration, obtains one or more metrics associated with its current operating environment and/or current operating configuration. In turn, the user devices analyzes the metrics to determine whether to alter its current connectivity configuration. Responsive to the analysis, some embodiments modify the current connectivity configuration by modifying a connection type to a wireless networking device.

The various embodiments described herein provide dynamic reconfiguration of wireless connections between a wireless networking device and user devices. When initiated by the wireless networking device, the wireless networking device can reconfigure the connection types for optimal distribution of its corresponding resources. In other words, the reconfiguration sets up the connection types to a configuration that has the best potential of utilizing the resources of the wireless networking device based upon the operating parameters of the various connected and/or associated user devices. For example, the wireless networking device can switch a first user device from a beam-formed wireless connection to an omnidirectional wireless connection signal if the respective metrics of the first user device indicate it may not use the beam-formed wireless connection to its full potential level. In turn, the wireless networking device can then redirect resources (e.g., the beam-formed wireless connection) to a second user device whose metrics indicate it is more likely to use the beam-formed signal connection to capacity and/or a satisfactory level. While the wireless networking device dynamically reconfigures the connection types to an optimal configuration, in real-world implementations, the actual distribution of resources may not reach its full (and optimal) potential.

Similarly, a user device can reconfigure its connection type to a wireless networking device as a way to preserve its associated resources. For instance, the user device can initiate a change from a beam-formed signal connection with a wireless networking device to an omnidirectional signal connection to preserve its battery life, or initiate a change from an omnidirectional signal connection to a beam-formed signal connection to support data-heavy applications. In some embodiments, a user can prioritize when the changes occur, as further described herein. Thus, user device initiated changes to its connectivity configuration and/or connection type allows the user device more control over how it operates which, in turn, allows the user device to determine how to use and/or preserve its corresponding resources.

While features and concepts for dynamic connectivity configuration of a wireless network device and/or a user device can be implemented in any number of different devices, systems, environments, and/or configurations, example embodiments of dynamic reconfiguration of wireless connections are described in the context of the following example devices, systems, and methods.

Example Operating Environment

FIG. 1 illustrates example environment 100 according to one or more embodiments. Environment 100 includes wireless networking device 102, illustrated here as an access point. Among other things, wireless networking device 102 provides various user devices with connectivity into a wired network, such as the Internet. In this example, wireless networking device 102 provides connectivity to user device 104 (illustrated as a tablet), user device 106 (illustrated as a laptop), and user device 108 (illustrated as a mobile phone). In environment 100, each of the user devices are located within working range of wireless networking device 102. In other words, each user device establishes a respective wireless connection with wireless networking device 102, and subsequently uses its respective wireless connection to exchange data and/or information with the wireless networking device. Here, user device 104 wirelessly connects with wireless networking device 102 via wireless signals 110a, user device 106 wirelessly connects with computing device via wireless signals 110b, and user device 108 wirelessly connects with wireless networking device 102 via wireless signals 110c. Wireless signals 110a, wireless signals 110b, and wireless signals 110c generally represent two-way communication between the devices, such as transmit and receive signals for each respective device associated with the wireless signal.

Wireless networking device 102 includes an ability to establish different wireless connection types with different user devices simultaneously, such as beam-formed signal connection types with some user devices, omnidirectional signal connection types with other user devices, and so forth. For instance, wireless networking device 102 can use a first antenna to generate an omnidirectional wireless signal that various user devices utilize to connect to, and exchange data with, wireless networking device 102. Alternately or additionally, wireless networking device 102 can use additional pairs of antennas to generate directional wireless signals (using beamforming techniques) to specific user devices. Here, wireless networking device 102 transmits wireless signals 110a as an omnidirectional wireless signal to establish a communication path with user device 104, and additionally transmits beam-formed (directional) wireless signals 110b to user device 106, and beam-formed (directional) wireless signals 110c to user device 108, to establish respective communication paths with each user device. However, if, at some later point in time, environment 100 changes and/or the operating parameters associated with the user devices change, some embodiments of wireless networking device 102 can dynamically initiate changes to these wireless connections in response to these changes as further described herein.

Wireless networking device 102 includes network connectivity management module 112 to manage the various wireless signals and/or wireless connection types to external user devices (e.g., wireless signals 110a to user device 104, wireless signals 110b to user device 106, etc.). In some embodiments, networking connectivity management module 112 includes knowledge to implement and/or conform to various control standards, such as the Institute of Electrical and Electronics Engineers (IEEE) 802.11 standards corresponding to media access control (MAC) and/or physical layer (PHY) communication standards. Among other things, network connectivity management module 112 can query connected user devices and/or associated user devices in environment 100 to identify which user devices are capable of connecting with wireless networking device 102 via a beam-formed signal. Here, associated user devices include those that are within working range of wireless networking device 102, but have not yet established an authorized wireless communication path with the wireless networking device as further described herein. After identifying which user devices are capable of supporting beam-formed communications, network connectivity management module 112 can direct beam-formed signals to specific user devices. The beam-formed signals can be directed to a specific user device in any suitable manner (e.g., randomly, a first-to-connect manner, priority based, etc.).

Some embodiments of network connectivity management module 112 determine respective metrics about each user device to identify an operating environment and/or respective operating parameters of environment 100. In turn, network connectivity management module 112 prioritizes the user devices based upon the metrics to identify which user devices would better utilize a beam-formed signal connection relative to other user devices. In other words, network connectivity management module 112 identifies the user devices with an operating environment and/or operating configuration that would better utilize the resources associated with the beam-formed signal connection relative to other user devices. Network connectivity management module 112 can then analyze the current connectivity configuration of the wireless networking device (e.g., which user devices are connected via beamforming and which user devices are connected via an omnidirectional signal) to determine if it matches and/or aligns with the prioritized list. If the current connectivity configuration differs from the prioritized list of user devices, some embodiments of network connectivity management module 112 initiate and/or dynamically reconfigure individual wireless connections of selected user devices to align the current connectivity configuration with the prioritized. In other words, network connectivity management module 112 modifies the current connectivity configuration to align with the prioritized list so that the user devices connected to the wireless networking device via beamforming techniques are the user devices identified as having the highest priority in the prioritized list. This can include disconnecting a first user device from a beam-formed wireless connection, reconnecting to the first user device using an omnidirectional wireless signal, and then redirecting the beam-formed wireless connection to a second user device as further described here.

In a similar manner, user device 108 includes user connectivity management module 114. Here, user connectivity management module 114 monitors an operating state and/or an operating environment associated with user device 108 by analyzing various metrics associated with user device. In turn, user connectivity management module 114 manages the connectivity configuration and/or connection type of user device 108 that is used to communicate with wireless networking device 102. For instance, user connectivity management module 114 can monitor a battery level of user device 108 (e.g., percentage of power left) to identify when it drops below a predefined threshold. When the battery level drops below the threshold, user connectivity management module 114 can initiate a change to switch user device 108 from using a beam-formed signal connection (e.g., wireless signals 110c) to using an omnidirectional signal connection (e.g., wireless signals 110a) as a way to conserve battery power. While described in the context of a single metric (e.g., battery level), some embodiments manage the connectivity configuration based upon multiple metrics as further described herein.

Figure 2:
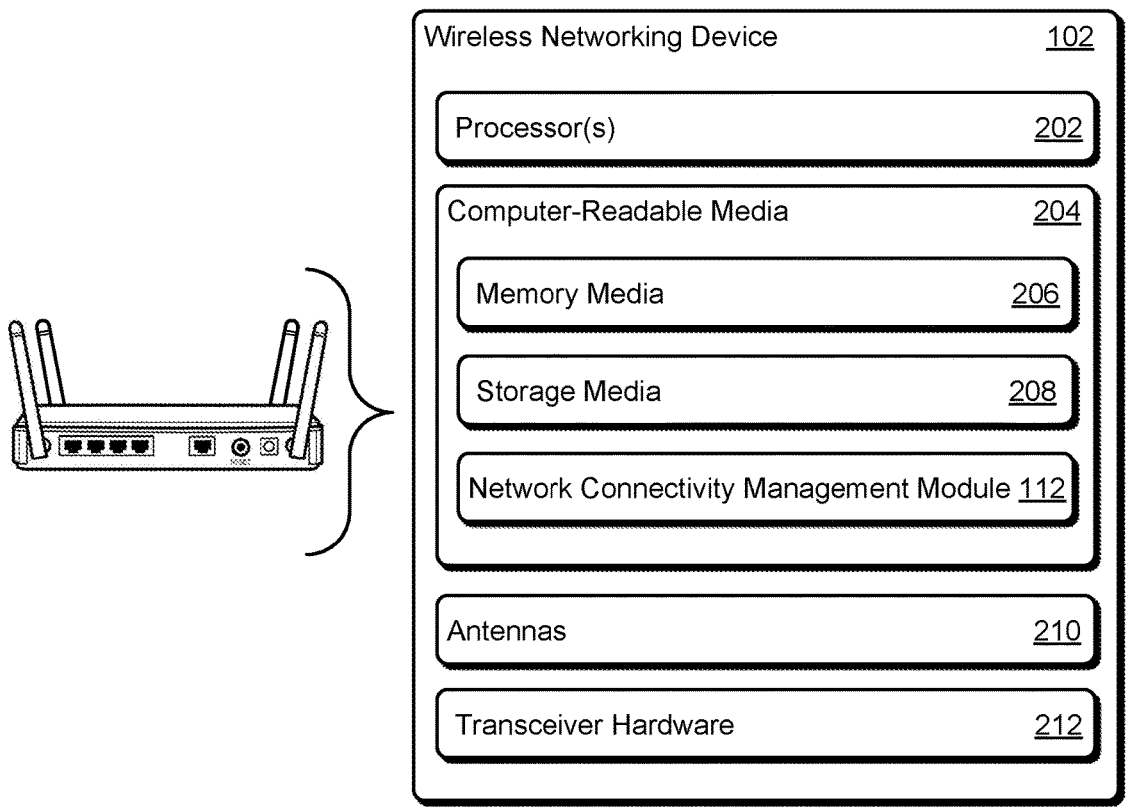
FIG. 2 illustrates an example wireless networking device in accordance with one or more embodiments.
Figure 3:
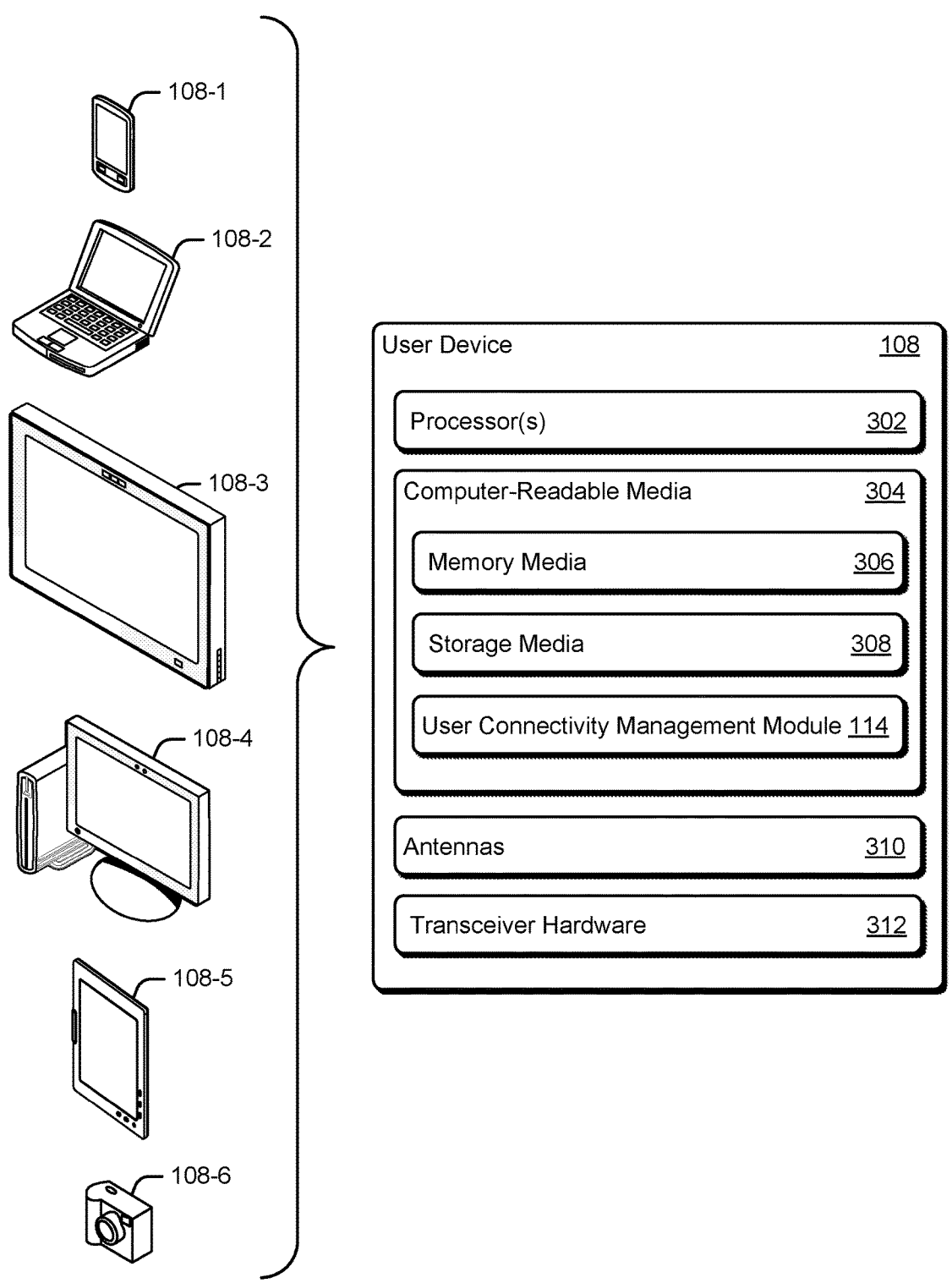
FIG. 3 illustrates non-limiting examples of a user device with in accordance with one or more embodiments.

FIG. 2 illustrates an expanded view of wireless networking device 102 of FIG. 1, while FIG. 3 illustrates an expanded view of user device 108 with various non-limiting examples: smart phone 108-1, laptop 108-2, display 108-3, desktop personal computer (PC) 108-4, tablet 108-5, and camera 108-6. In some embodiments, wireless networking device 102 and user device 108 have similar components. Accordingly, for the purposes of brevity, FIG. 2 and FIG. 3 will be described together. Components associated with FIG. 2 will be identified as components having a naming convention of "2XX", while components associated with FIG. 3 will be identified as components having a naming convention of "3XX". Conversely, components distinct to each device will be described separately and after the similar components Among other things, wireless networking device 102/user device 108 includes processor(s) 202/processor(s) 302 and computer-readable media 204/computer-readable media 304. In this example, computer-readable media 204/computer-readable media 304 includes memory media 206/memory media 306 and storage media 208/storage media 308. Applications and/or an operating system (not shown) embodied as computer-readable instructions on computer-readable media 204/computer-readable media 304 are executable by processor(s) 202/processor(s) 302 to provide some, or all, of the functionalities described herein. For example, various embodiments can access an operating system module and/or software drivers, which provide high-level access to underlying hardware functionality by obscuring implementation details from a calling program, such as protocol messaging, register configuration, memory access, and so forth. In turn, various applications can invoke functionality provided by the operating system module and/or software drivers to access functionality provided by corresponding hardware.

Computer-readable media 204 includes network connectivity management module 112. Similarly, computer-readable media 304 includes user connectivity management module 114. While network connectivity management module 112 is illustrated here as residing on computer-readable media 204, and user connectivity management module is illustrated here as residing on computer-readable media 304, each can alternately or additionally be implemented using hardware, firmware, software, or any combination thereof.

Wireless networking device 102/user device 108 also include antennas 210/antennas 310 and transceiver hardware 212/transceiver hardware 312. Antennas 210/antennas 310 work in concert with transceiver hardware 212/transceiver hardware 312 to enable wireless networking device 102/user device 108 to transmit and receive wireless signals. For instance, antennas 210/antennas 310 receive electrical signals generated by transceiver hardware 212/transceiver hardware 312, and propagate corresponding electromagnetic waves in free-space. Similarly, antennas 210/antennas 310 receive or detect electromagnetic waves propagating in free space, and convert these waves into corresponding electrical signals that are then routed and processed via transceiver hardware 212/transceiver hardware 312. In some embodiments, network connectivity management module 112 controls the configuration of the antennas 210 and/or transceiver hardware 212 based upon a prioritized list of connected devices as further described herein. Alternately or additionally, in other embodiments, user connectivity management module 114 controls or manages the configuration of antennas 310 and/or transceiver hardware 312 based upon various metrics associated with user device 108.

Having described an example operating environment in which various embodiments can be utilized, consider now a discussion of signal radiation patterns in accordance with one or more embodiments.

Signal Radiation Patterns

Computing devices today often times include wireless capabilities to connect with other devices. To communicate information back and forth, the computing devices establish a wireless link between one another that conforms to predefined protocol and frequency standards. This conformity provides a mechanism for the devices to synchronize and exchange data via the wireless signals. A wireless link can be more powerful than a wired link in that it provides more freedom to the connecting devices. A device can connect wirelessly to any recipient device that supports a same wireless link format without using any additional peripheral components or devices. Not only does this allow the devices to exchange data, but it provides the additional benefit of mobility by eliminating a wired connection that physically tethers the communicating device.

Antennas are used to propagate and receive wireless signals. Being a form of electromagnetic radiation, the wireless signals propagated between the respective devices adhere to various wave and particle properties, such as reflection, refraction, scattering, absorption, polarization, etc. One type of antenna design is a dipole antenna. A dipole antenna includes two components that are usually symmetrical in length. In a half-wave dipole antenna, each pole has length of $\lambda/4$, where $\lambda$ represents a wavelength corresponding to a frequency at which the dipole antenna is resonant. When an antenna is resonant, waves of current and voltage traveling between the arms of the antenna create a standing wave. Further, the antenna has its lowest impedance at its resonant frequency, thus simplifying impedance matching between the antenna and transmission lines for transmission or reception. In turn, this affects the power consumption and efficiency of an antenna. By careful adjustments to the antenna length, radius, and so forth, a designer can choose what frequency the corresponding antenna resonates at. When transmitting, dipole antennas radiate with an omnidirectional pattern. However, other antenna configurations can be used to transmit omnidirectional patterns as well. One advantage to an omnidirectional radiation pattern is that it yields comprehensive coverage over a large area.

Figure 4A:
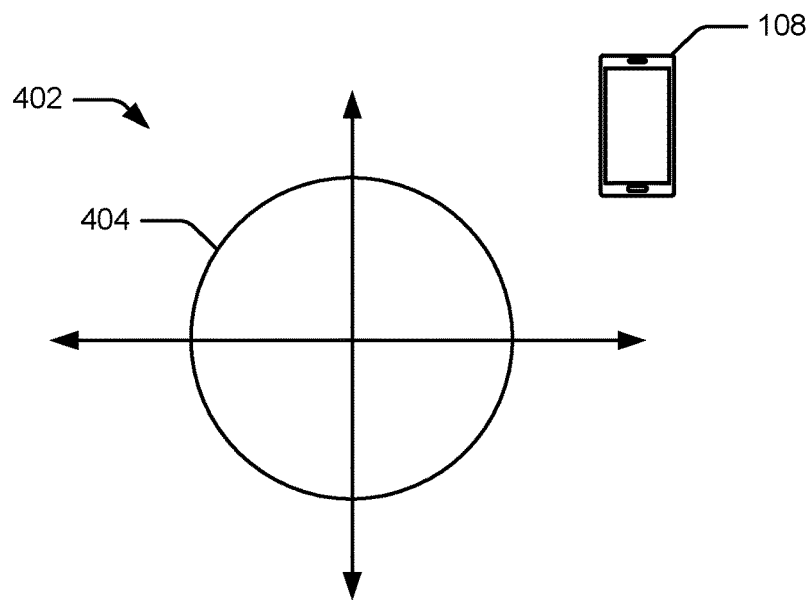
FIGS. 4a and 4b illustrate two-dimensional transmission patterns in accordance with one or more embodiments.

Consider FIG. 4a that illustrates a two-dimensional graph 402 that plots an example omnidirectional radiation pattern 404. Here, the omnidirectional radiation pattern forms a circle of coverage, where the corresponding antenna radiates an equal amount of energy in all directions, but real-world implementations can deviate from this due to physical variations in the implementations. FIG. 4a also includes user device 108 of FIG. 1 as the intended target or recipient of radiation pattern 404. In this example, user device 108 has been position in the upper right quadrant of graph 402. However, due to radiation pattern 404 having equal amounts of energy in all direction, user device 108 can move to other quadrants and receive the same signal and/or energy level. This also holds true for other devices that are co-resident within graph 402. For instance, consider a case in which a laptop resides in the lower left quadrant of graph 402. Since radiation pattern 404 is omnidirectional, the corresponding wireless signal can service the laptop as well, although time-slicing of data transmission and/or logical channels may be used to alternate what information is sent when (e.g., user device 108 is serviced in time slot 1, the lap top in time slot 2, etc.).

In terms of connecting with other devices, an omnidirectional radiation pattern allows the transmitting device to transmit without having any information on the location of a connecting device, since energy is transmitted equally in all directions. Thus, in terms of wireless networking device 102 of FIG. 1, radiation pattern 404 allows the wireless networking device to transmit in all directions to service various user devices without needing any a priori knowledge of where the user devices are physically located. As an added benefit, the construction of omnidirectional antennas (such as a dipole antenna) are inexpensive to build relative to other antennas. In turn, these cost savings can be passed along to a consumer who wishes to purchase the transmitting device. An omnidirectional radiation pattern also allows flexibility in where the transmitting device is located, since the signal is transmitted in all directions. This can be advantageous to a wireless networking device, since they service multiple devices simultaneously. However, a downside to this approach is that since the antenna transmits energy in all directions, it also receives energy in all directions, thus reducing the signal-to-noise ratio (SNR), which, in turn, can make the communications more prone to errors. Another disadvantage to an omnidirectional radiation pattern is that it may have a shorter projection distance and/or range than other types of antenna. In other words, the signal strength of an omnidirectional radiation pattern can diminish more quickly as the signal radiates outwardly, since energy is being transmitted in all directions. As an alternative to an omnidirectional transmission pattern, other antennas transmit a directional signal using beamforming techniques.

Figure 4B:
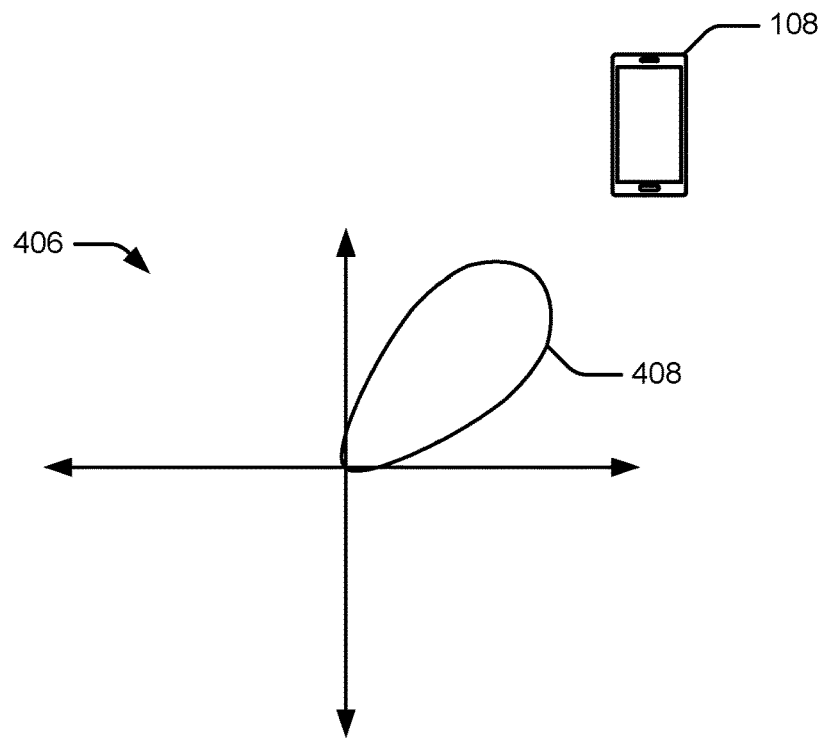

Beamforming combines transmissions from multiple antenna to create emission patterns with constructive or destructive interference. More particularly, a controlling element, such as network connectivity management module 112 of FIG. 1, influences the frequency, phase, and/or amplitude of each radio frequency (RF) signal transmitted from a respective antenna to transmit a signal with a selective spatial pattern and/or direction. To illustrate, now consider FIG. 4b that illustrates a two-dimensional graph 406 that plots an example beam-formed radiation pattern 408. As in the case of radiation pattern 404, real-word implementations of radiation pattern 408 can vary due to physical variations in a corresponding implementation. FIG. 4b also includes user device 108 of FIG. 1 positioned in the upper right quadrant of graph 406. Here, radiation pattern 408 represents a beam-formed wireless signal transmitted in the direction of user device 108. Thus, if user device 108 moved from the upper right quadrant to the lower left quadrant, the connection established with radiation pattern 408 would break until the beam-formed signal reforms to transmit in a direction associated with the lower-left quadrant.

Beamforming focuses energy towards a particular direction, which, in turn, increases the power of the corresponding signal since the signal is not dispersed in multiple directions. This can improve the corresponding SNR and allow the transmitting device to improve data rates (e.g., transmit more data further) and extend how far the transmitted signal can travel. For example, a user device using streaming services for video and/or audio has a constant need for high volumes of data transfer. To satisfy this request, a wireless networking device, such as an access point, can connect with the user device using a beam-formed signal, and subsequently transfer the requested data more efficiently and/or at a higher rate than an omnidirectional signal. While a beam-formed signal can provide improved efficiency relative to other signals and/or radiation patterns, variations in a corresponding environment can mask or diminish this improvement.

Consider an example in which a user device is located at close range to a wireless networking device. When connecting to user devices positioned a short distance away, an omnidirectional radiation pattern (transmitted by the wireless networking device) has a high SNR that translates into improved data rates relative to mid-range or long-range devices. Thus, at short distances, beam-formed radiation patterns may not provide improved performance relative to the omnidirectional radiation pattern. Similarly, for user devices positioned at long distances away from the wireless networking device, the beam-formed wireless signal may provide connectivity to the user device, but with a low data throughput. Thus, while the beam-formed wireless signal can connect to a user device a long distance away, its efficiency and/or data throughput is not being used to its full potential. Accordingly, beamforming can provide connectivity at various ranges, but the improved efficiency (relative to other radiation patterns) can vary over the different ranges (e.g., short ranges can be equivalent, long ranges do not provide full capacity).

Having described differences between various radiation patterns, consider now a discussion of dynamic connectivity configuration of a wireless networking device in accordance with one or more embodiments.

Dynamic Connectivity Configuration of a Wireless Networking Device

A wireless networking device can simultaneously support multiple different wireless connection types through the use of multiple antenna. For instance, a first antenna of the wireless networking device can be directed towards wireless communications using an omnidirectional radiation pattern, and other antennas can be directed towards wireless communication using beamforming techniques. This allows the wireless networking device to support older (legacy) devices using the omnidirectional antenna, and newer devices using the beamforming techniques. Thus, by supporting multiple different wireless connection types, the same wireless networking device can support older devices, while providing new technology to newer devices via beamforming techniques.

Multiple-User Multiple Input Multiple Output (MU-MIMO) technology, as described with respect to the IEEE 802.11ac standard, is one such example. MU-MIMO improves the speed and capacity of data delivered by a wireless networking device by using multiple antennas to deliver multiple beam-formed signals simultaneously instead of time-slotting a single connection (e.g., partitioning the single connection in time to alternate what data goes to which device). However, based upon various limitations, the maximum number of antenna available for simultaneous MU-MIMO communications is one less than the number of available antenna. These limitations stem from various conditions the wireless networking device has to fulfill during data transmission, such as controlling areas of maximum constructive interference in order to direct the strongest signal to a desired client, controlling areas of maximum destructive interference to reduce signal interference at other devices, and so forth. To illustrate the connections support by MU-MIMO, consider a case in which an access point includes four antenna. Based upon the various limitations, the access point can maintain three simultaneous MU-MIMO streams (via beamforming), and one omnidirectional signal connection stream.

While the inclusion of MU-MIMO in a wireless networking device can improve its data rates and extend its transmission range, there are times the connectivity configuration of the wireless networking device (e.g., which user devices connect via beam-formed signals versus omnidirectional signals) fails to optimize the wireless networking device for maximum data throughput in a given operating environment. For instance, without applying any preferences or priority to which user devices connect using beam-formed signal connections, the wireless networking device may connect to user devices unable to use the full potential of a beam-formed signal, or user devices that that are equally served by omnidirectional signals, when other user devices exist. Thus, the wireless networking device can sometimes have a less-optimal connectivity configuration that fails to maximize its data throughput capabilities.

Various embodiments provide dynamic connectivity configuration of a wireless networking device. To begin, a wireless networking device maintains multiple wireless connections with multiple user devices using a combination of beam-formed wireless signals and omnidirectional wireless signals. As the environment around the wireless networking device changes, and/or the operating performance of the associated user devices changes, the wireless network device can dynamically alter how it connects to the user devices. The wireless networking device determines a current connectivity state that identifies which user devices are connected using beam-formed signals and omnidirectional signals. Next, the wireless networking device generates a list of connected and/or associated user devices that are capable of beam-formed wireless communications, and subsequently generates and/or obtains respective metrics for each respective user device. The wireless networking device then analyzes the metrics, and generates a prioritized list of user devices that are capable of beam-formed communications based upon the respective metrics.

Figure 5:
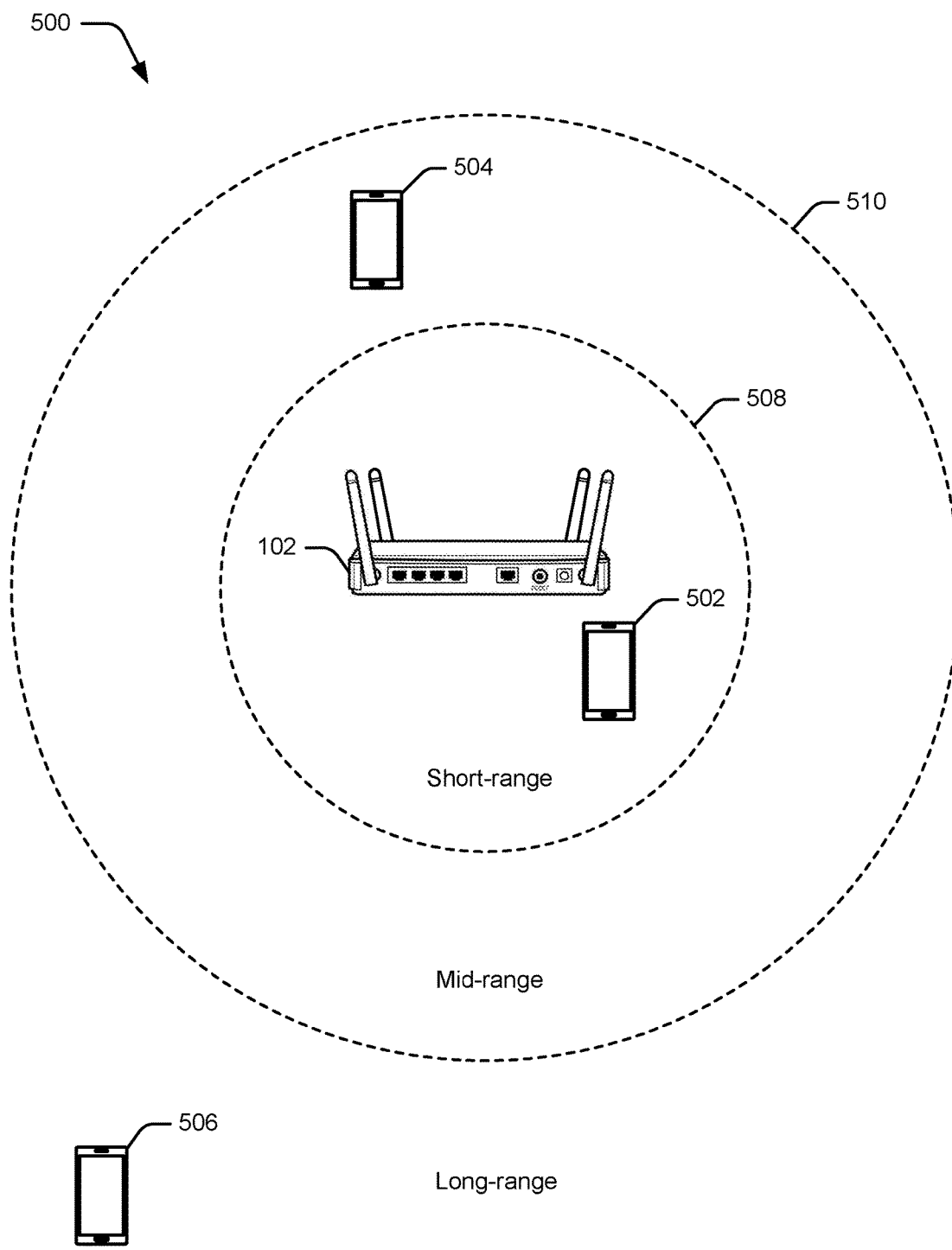
FIG. 5 illustrates various operating regions and/or ranges in accordance with one or more embodiments.

Consider FIG. 5, which illustrates an environment 500 in which a wireless networking device uses various metrics to analyze and/or prioritize various user devices. Here, environment 500 includes wireless networking device 102 of FIG. 1, and multiple user devices connected to, or associated with, the wireless networking device: user device 502, user device 504, and user device 506 respectively. In environment 500, wireless networking device 102 partitions environment 500 into three operating regions: a short-range region that resides on the inside of circle 508, a mid-range region that resides outside of circle 508, and inside circle 510, and a long-range region that resides outside of circle 510. While wireless networking device 102 has partitioned the environment into three regions, it is to be appreciated that any other number of partitions can be utilized as well. Each region (e.g., short-range, mid-range, long-range) defines a respective space relative to wireless networking device 102, where the wireless networking device characterizes a respective user device by the region in which it operates. Thus, some embodiments of wireless networking device 102 characterize user device 502 as operating in a short-range operating region, user device 504 as operating in a mid-range operating region, and user device 506 as operating in a long-range operating region.

These regions, while illustrated as being circular in nature, can be any suitable shape or size. Here, the short-range region corresponds to a region that starts from the wireless networking device to a first outer boundary distance from wireless networking device 102 identified by circle 508. In turn, the mid-range region extends between the first outer boundary distance and second outer boundary distance from the wireless networking device as defined by circle 508. Finally, the long-range region extends outside of the second outer boundary distance defined by circle 508. Any suitable type of metric can be used to define the boundaries between regions. For instance, some embodiments define the regions based upon distance, where the wireless networking device can predefine what distance each region covers, and subsequently measure a particular user device's distance (and identify its operating region) using round-trip-time (RTT) information. However, other metrics and/or protocols can be used to define these regions and/or measure a user device's distance, such as those described with respect to IEEE 802.11.

Consider a Received Signal Strength Indicator (RSSI) that provides a measurement of signal power present in a received signal. The wireless networking device can use an RSSI measurement of a connected and/or associated user device to identify how close that user device is to the wireless networking device and/or an operating region associated with the user device. For instance, a strong RSSI can be used to determine that the user device is operating within a short-range region, where the wireless networking device uses a predefined threshold value to identify and/or define a strong RSSI (e.g., strong RSSI values fall above the predefined threshold value). For instance, the wireless networking device can compare each respective RSSI value to a predefined threshold as a way to identify a corresponding operating region of the respective user device (e.g., a short-range operating region). In a similar manner, a weak RSSI indicates the particular user device is further away from the wireless networking device and operating in a long-range range/region, where a second predefined threshold value defines a weak RSSI signal (e.g., weak RSSI values fall below the second predetermined threshold value). In turn, the mid-range range/region corresponds to RSSI values that fall in a range between strong RSSI values and weak RSSI values. Thus, some embodiments characterize user device 502 as operating in a short-range region based upon its corresponding RSSI value.

By identifying a region in which a user device operates, wireless networking device 102 can prioritize which user devices have configurations and/or operating environments that will use more of the resources associated with a beam-formed communication relative to other user devices, such as bandwidth and/or data transfer. Recall from further discussions provide herein that, relative to omnidirectional signals, the data transfer efficiency provided by beam-formed signals varies over the different ranges (e.g., short ranges can be equivalent, long ranges do not provide full capacity). Accordingly, some embodiments of wireless networking device 102 prioritize user devices operating in short-range regions and/or long-range regions lower than user devices operating in mid-range regions. Consider user device 502 that has been characterized as operating in short-range of wireless networking device 102. Since wireless networking device 102 considers user device 502 as operating in short-range, wireless networking device 102 gives it a lower priority relative to user device 504. Similarly, since wireless networking device 102 has characterized user device 506 as operating in long-range, it prioritizes user device 506 lower than user device 504 as well. Thus, in environment 500, user device 504 has the highest priority relative to the other user devices to connect to wireless networking device 102 via beam-formed signals. However, other parameters can influence how a wireless networking device prioritizes which user devices to connect to using beam-formed wireless signals.

Consider prioritization based upon a Quality-of-Service (QoS). Some aspects of QoS refer to a level or quality of service provided by a corresponding network. For example, QoS allows a network to prioritize different applications, user devices and so forth within the network in order to meet various conditions or demands. Wireless MultiMedia (WMM) provides a form of QoS in a Wi-Fi network by prioritizing data traffic based upon four categories: voice data, video data, best effort data, and background data. A Wi-Fi network using WMM prioritization makes the Wi-Fi network suitable for applications such as Voice-over Internet Protocol (VoIP) since the prioritization places greater emphasis on voice data and video data, which, in turn, alleviates glitches and/or dropped calls. Some embodiments of a wireless networking device determine which user devices to provide a beam-formed signal connection based upon the applications a user device may be running and/or WMM prioritizations. Thus, user devices running applications with higher prioritization and/or bandwidth needs, such as a VoIP application, may be given higher priority than other user devices.

As another example, a wireless networking device can determine which user devices to provide beam-formed signal connections based upon a level of interference at the user device. Consider a case where the wireless networking device identifies a first user device operating in a mid-range region and running an application with a high WMM prioritization. Based upon these metrics, the wireless networking device determines to provide the first user device with a beam-formed wireless connection. However, during the connection, the wireless networking device then receives Bit Error Rate (BER) and/or Packet Error Rate (PER) information from the first user device that indicates it is unable to support an expected throughput due to interference from an overlapping beam from another wireless networking device. For instance, the BER and/or PER information may fall below a predefined threshold. In response to this information, the wireless networking device can reprioritize the first user device to a lower priority, and subsequently look for a second user device with metrics that indicates it can support the expected throughput. Upon finding the second user device, the wireless networking device removes the first user device from the beam-form connection, and reestablishes a connection with the first user device using an omnidirectional wireless signal. In turn, the wireless networking device establishes a beam-formed signal connection with the second user device, thus dynamically reconfiguring its connectivity configuration to a more optimal configuration.

Some embodiments of the wireless networking device govern the prioritization process using a delay or hysteresis. In other words, the wireless networking device may prioritize the user devices in such a way that it identifies changes to make to its connectivity configuration, but delays making the changes to avoid any thrash or sudden reversals in the connectivity configuration. For instance, consider an example in which there are temporary anomalies or changes in the operating state of a user device. If the wireless networking device detects these temporary anomalies, it may change the connectivity configuration based on the corresponding (instantaneous) metrics. Here, the phrase "temporary anomalies" is used to denote a change in state or operating that occurs for a short time-period such that once the corresponding modifications are made to the connectivity configuration of the wireless networking device, the anomaly completes or disappears, and the changes to the connectivity configuration no longer provide an optimal configuration. Thus, temporary anomalies can cause thrash in the connectivity configuration such that the wireless networking device spends more time reconfiguring its connectivity configuration than servicing the user devices. Accordingly, some embodiments apply a delay or hysteresis to identify and/or detect temporary anomalies in an operating state to avoid unnecessary and/or temporary changes. This can be achieved in any suitable manner, such as through the use of a predefined time delay. When a change is identified, the wireless networking device can wait for a time-period corresponding the predefined time delay, and verify the identified change has settled and/or is in a same state before initiating changes to the corresponding connectivity configuration.

Figure 6A:
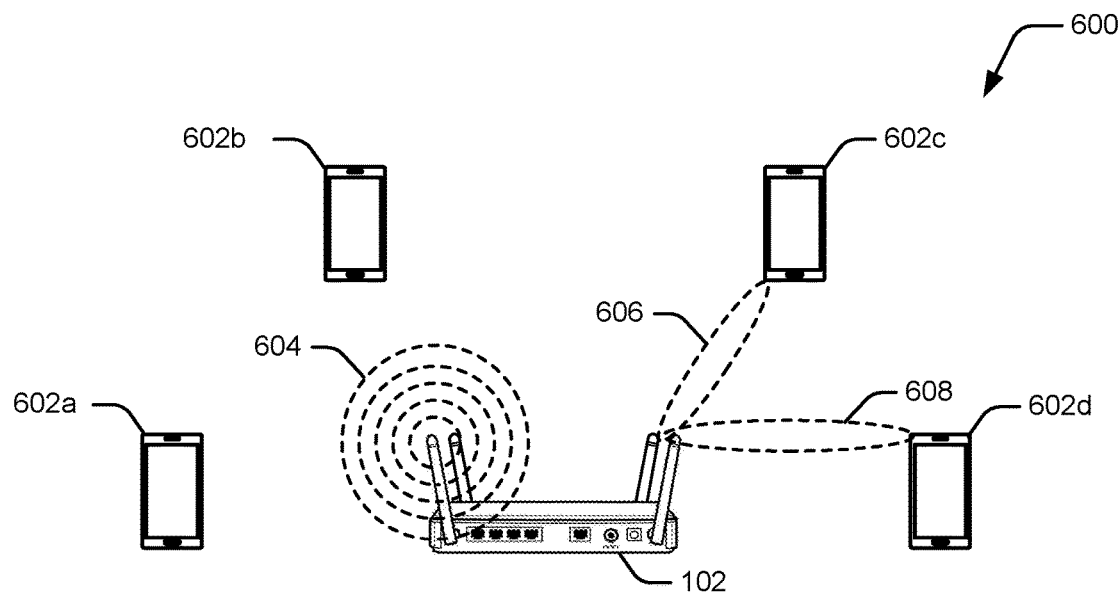
FIGS. 6a and 6b illustrate example operating environments in which wireless connections between multiple user devices and a wireless networking device are dynamically altered in accordance with one or more embodiments.
Figure 6B:
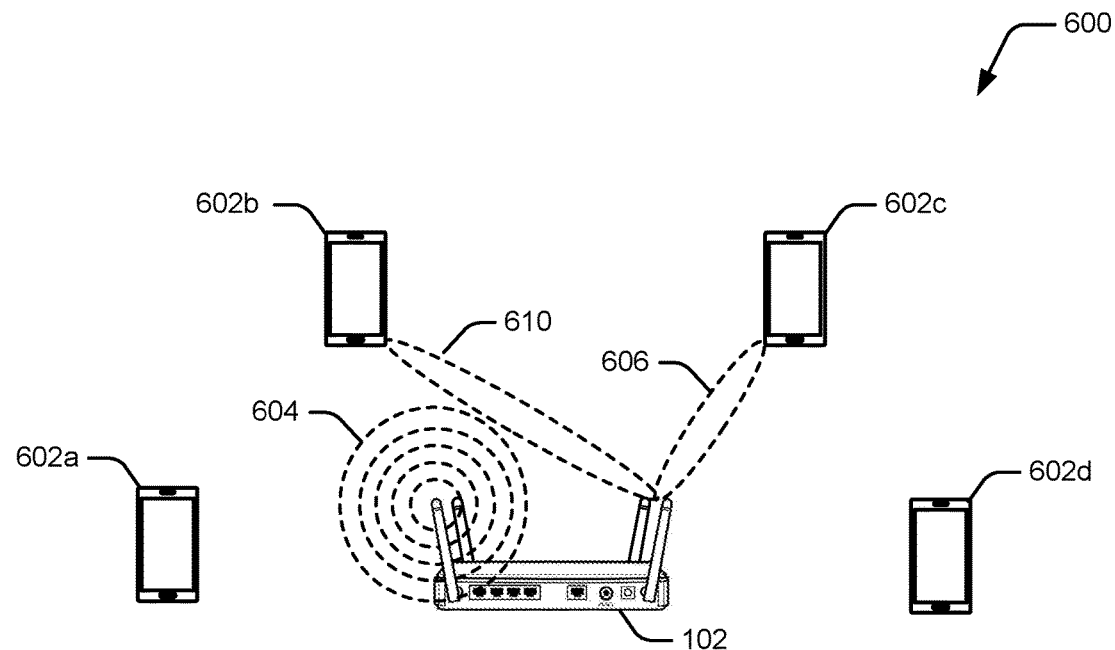

Consider now FIGS. 6a and 6b that illustrate an environment. Here, FIG. 6a illustrates environment 600 at a first point in time, where a wireless networking device uses a first connectivity configuration, and FIG. 6b illustrates environment 600 at a second point in time, where the wireless networking device uses a second connectivity configuration. FIGS. 6a and 6b each include wireless networking device 102 of FIG. 1, and various mobile devices, labeled here as user device 602a, user device 602b, user device 602c, and user device 602d, respectively.

In FIG. 6a, wireless networking device 102 transmits an omnidirectional signal 604, which is used by user device 602a and user device 602b to connect with wireless networking device. Wireless networking device 102 also, and simultaneously, transmits a first beam-formed signal 606 to user device 602c, and a second beam-formed signal 608 to user device 602d. For simplicity's sake, these wireless signals (e.g., omnidirectional signal 604, beam-formed signal 606, and beam-formed signal 608) are illustrated as generally radiating from wireless networking device 102, but it is to be appreciated that varying combinations of antennas are used to generate these signals as further described herein. The determination to use beam-formed signal connections with user device 602c and user device 602d can be performed in any suitable manner, such as by a prioritization based upon metrics (e.g., a range or distance, a QoS metric and/or prioritization, an RSSI metric, and so forth).

When a user device supports multiple wireless configurations (e.g., both omnidirectional wireless signals and beam-formed wireless signals), the wireless networking device can dynamically switch its connection type to the user device. For example, assume, for discussion purposes, that user device 602b supports both beam-formed communications and omnidirectional communications. However, in FIG. 6a, wireless networking device 102 assigns user device 602b a lower priority than user device 602d and user device 602c for various reasons. Subsequently, user device 602b connects to wireless networking device 102 via omnidirectional signal 604, since the beam-formed signals are directed to the higher priority user devices. In other words, even though user device 602b supports beam-formed communications, its priority for beam-formed communications in FIG. 6a is lower than other user devices, so it subsequently connects and/or communicates with wireless networking device 102 using omnidirectional signals.

Continuing on, now consider user device 602d of FIG. 6a. Here, user device 602d is running an application that has data consumption needs associated with a WMM priority of Best Effort (BE). Based upon this metric, wireless networking device 102 assigns user device 602d a higher priority than user device 602b. In turn, wireless networking device 102 connects to, and/or communicated with, user device 602d via beam-formed signal 608. However, changes in the environment can initiate changes to the connectivity configuration of the wireless networking device as further described herein.

FIG. 6b illustrates a change the operating environment around wireless networking device 102, such as a change in operating configurations associated with user device 602b and user device 602d. Here, user device 602b has initiated an application associated with VOice (VO) data streaming. Since WMM prioritizes VO data higher than BE data, user device 602b now has higher priority than user device 602d. In turn, wireless networking device 102 identifies this change occurring, and modifies its connectivity configuration based upon these changes. While described in the context of a change in application priorities (based on WMM prioritization), other types of changes in the operating environment can occur as well, such as new user devices connecting to wireless networking device 102, user devices disconnecting from wireless networking device 102, user devices moving locations, changes in RSSI values, and so forth.

Changes to an operating environment and/or a user device configuration can be identified in any suitable manner. In some embodiments, the wireless networking device periodically queries the MAC layer for information obtained from the user devices. For instance, IEEE 802.11 provides mechanisms that gather and/or obtain information associated with the user device's operating configuration and/or operating environment during communication exchanges. In turn, the wireless networking device can query the MAC layer for this information. Alternately or additionally, the wireless networking device receives (asynchronous) incoming messages with an indication of a change (e.g., connection request, disconnect request, RSSI update, etc.), or receives metric information as data embedded in a data packet. In turn, and/or responsive to identifying that a change in the operating environment has occurred, the wireless networking device obtains and/or analyzes the metrics to generate a prioritized list of connected and/or associated user devices, and whether its current wireless connectivity configuration supports the current prioritization. If the current wireless connectivity configuration does not align and/or differs in prioritization from the current prioritization, the wireless networking device can dynamically reconfigure its wireless connectivity to optimize and/or improve data throughput.

Accordingly, in FIG. 6b, wireless networking device 102 identifies user device 602b as a first user device to disconnect a beam-formed signal from, and subsequently disconnects beam-formed signal 608 from user device 602b. In turn, wireless networking device 102 identifies user device 602b as a second user device to connect to using a beam-formed wireless signal, and subsequently redirects the corresponding resources to user device 602b via beam-formed signal 610. Here, wireless networking device forms a new beam-formed signal 610, but in other embodiments, the resources can be redirected to an existing beam-formed signal, such as beam-formed signal 606. Prior to connecting with user device 602b via beam-formed signal 610, wireless networking device 102 first disconnects user device 602d from beam-formed signal 608 of FIG. 6a, and establishes a new connection with user device 602d via omnidirectional signal 604. In turn, wireless networking device 102 then disconnects user device 602b from omnidirectional signal 604, and reconnects with user device 602b using beam-formed signal 610. Thus, the ability to dynamically modify its connectivity configuration (by modifying various connection types to user devices) allows wireless networking device 102 to respond to changes in its operating environment and/or the user devices it is currently supporting. This further allows wireless networking device 102 to reconfigure its environments in order to establish connections more likely to utilize its associated resources. As further described herein, these wireless signals (e.g., omnidirectional signal 604, beam-formed signal 606, and beam-formed signal 610) are illustrated as generally radiating from wireless networking device 102 for simplicity's sake.

Figure 7:
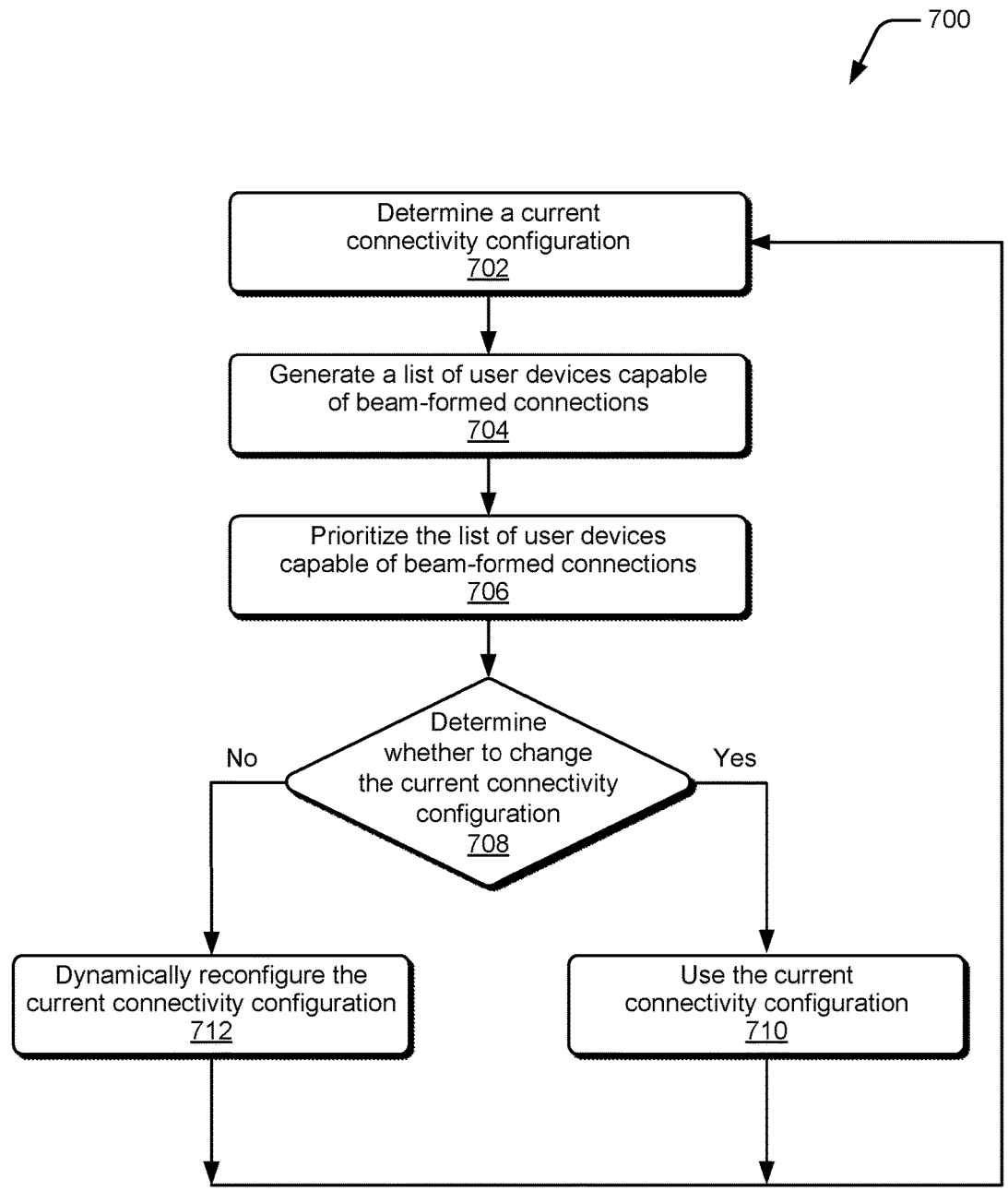
FIG. 7 is a flow diagram that illustrates operations of dynamically initiating alterations to wireless connection types by a wireless networking device in accordance with one or more embodiments.

FIG. 7 illustrates an example method 700 that dynamically reconfigures a wireless networking device in accordance with one or more embodiments. Generally, any services, components, modules, methods, and/or operations described herein can be implemented using software, firmware, hardware (e.g., fixed logic circuitry), manual processing, or any combination thereof. For instance, method 700 can be performed by network connectivity management module 112 of FIG. 1. Some operations of the example methods may be described in the general context of executable instructions stored on computer-readable storage memory that is local and/or remote to a computer processing system, and implementations can include software applications, programs, functions, and the like. Alternately or in addition, any of the functionality described herein can be performed, at least in part, by any combination of hardware, software and/or firmware. While method 700 illustrates steps in a particular order, it is to be appreciated that any specific order or hierarchy of the steps described here is used to illustrate an example of a sample approach. Other approaches may be used that rearrange the ordering of these steps. Thus, the order steps described here may be rearranged, and the illustrated ordering of these steps is not intended to be limiting.

At block 702, a wireless networking device determines a current connectivity configuration associated with the wireless networking device. Some embodiments identify all connected user devices regardless of how they are connected. For example, when the wireless networking device supports multiple connection types (e.g., beam-formed signal connections and omnidirectional signal connections), the wireless networking device identifies a total number of connected user devices that includes user devices using beam-formed signal connections and user devices using omnidirectional signal connections. Alternately or additionally, the wireless networking device can identify associated user devices that are within working range, but have not yet established a wireless communication link with the wireless networking device. For example, as part of the IEEE 802.11 standards, there are three authentication states that can be assigned to a user device: 1) not authenticated or associated, 2) authenticated but not associated, and 3) authenticated and associated. In order to bridge a connection to the wireless networking device, a user device must be authenticated and associated. As part of the authentication and association process, the wireless networking device and user device exchange a series of management frames, such as a probe request. The user device can send a probe request to advertise its presence to the wireless networking device. In turn, the wireless networking device can extract information from the probe request to determine the user device's capabilities (e.g., beamforming capabilities) and identify associated user devices. Accordingly, in some embodiments, the wireless networking device identifies a respective connection type associated with each connected user device and/or associated user devices.

At block 704, the wireless networking device generates a list of user devices capable of beam-formed signal connections. As further described herein, a user device can support both omnidirectional and beam-formed signal connections to a wireless networking device. Thus, even though a user device may be connected to the wireless networking device via an omnidirectional signal, it may additionally support a beam-formed wireless connection. Here, the wireless networking device generates a list of user devices capable of beam-formed signal connections, regardless of how they currently connect to, or associated with, the wireless networking device.

At block 706, the wireless networking device prioritizes the list of user devices capable of beam-formed signal connections. In some embodiments, the wireless networking device obtains respective metrics for each user device on the list of user devices, and prioritizes the list based upon the metrics. The wireless networking device can obtain metrics in any suitable manner, such as by periodically querying for information (e.g., querying its MAC layer), by checking the WMM priority of the user devices, by receiving asynchronous information from a user device, by monitoring user device performance (e.g., BER, PER), and so forth. The wireless networking device can then prioritize the list based upon one or more of the metrics. When the wireless networking device uses multiple metrics to prioritize the list of user devices, some embodiments weight each metric to give some of the metrics a higher priority or more importance than other metrics. Here, the prioritized list identifies which user devices have priority to a beam-formed signal connection over other user devices. An example implementation of prioritizing a list of user devices can be seen in FIG. 8.

At block 708, the wireless networking device determines whether to change the current connectivity configuration associated with the wireless networking device. Here, the wireless networking device compares the prioritized list to the current connectivity to determine whether there are user devices that that would better utilize a beam-formed signal connection than those currently connected to the wireless networking device via a beam-formed signal connection. Alternately or additionally, the wireless networking device can apply a delay and/or hysteresis to determine whether to change the current connectivity configuration. If the wireless networking device determines that its current connectivity configuration aligns with the prioritized list and/or is in a settled state, then the method proceeds to block 710 and uses the current connectivity configuration. In turn, the method returns to block 702 to continue monitoring the current connectivity configuration to identify and/or determine when new changes have occurred. However, if the wireless networking device determines to change the current connectivity configuration, it proceeds to block 712 to dynamically reconfigure its current connectivity configuration.

At block 712, the wireless networking device dynamically reconfigures the current connectivity configuration based on the prioritized list. For instance, consider a scenario in which a new user device attempts to connect to the wireless networking device. Based upon an analysis of the corresponding metrics, the wireless networking device determines that the new user device has a higher priority for a beam-formed signal connection than another user device that is currently connected to the wireless networking device via a beam-formed signal connection. Recall from discussion provide herein that the wireless networking device has a finite number of beam-formed signal connections it can support based upon its associated number of antennas. In such a scenario, the wireless networking device can reconfigure its connectivity configuration to connect with the new user device via a beam-formed signal connection by first disconnecting the other user device, and redirecting the beamforming resources to the new user device. An example of dynamically reconfiguring a current connectivity configuration can be seen in FIG. 9. Upon reconfiguring the connectivity configuration, the method returns to block 702 to continue monitoring the current connectivity configuration to identify and/or determine when new changes have occurred.

Figure 8:
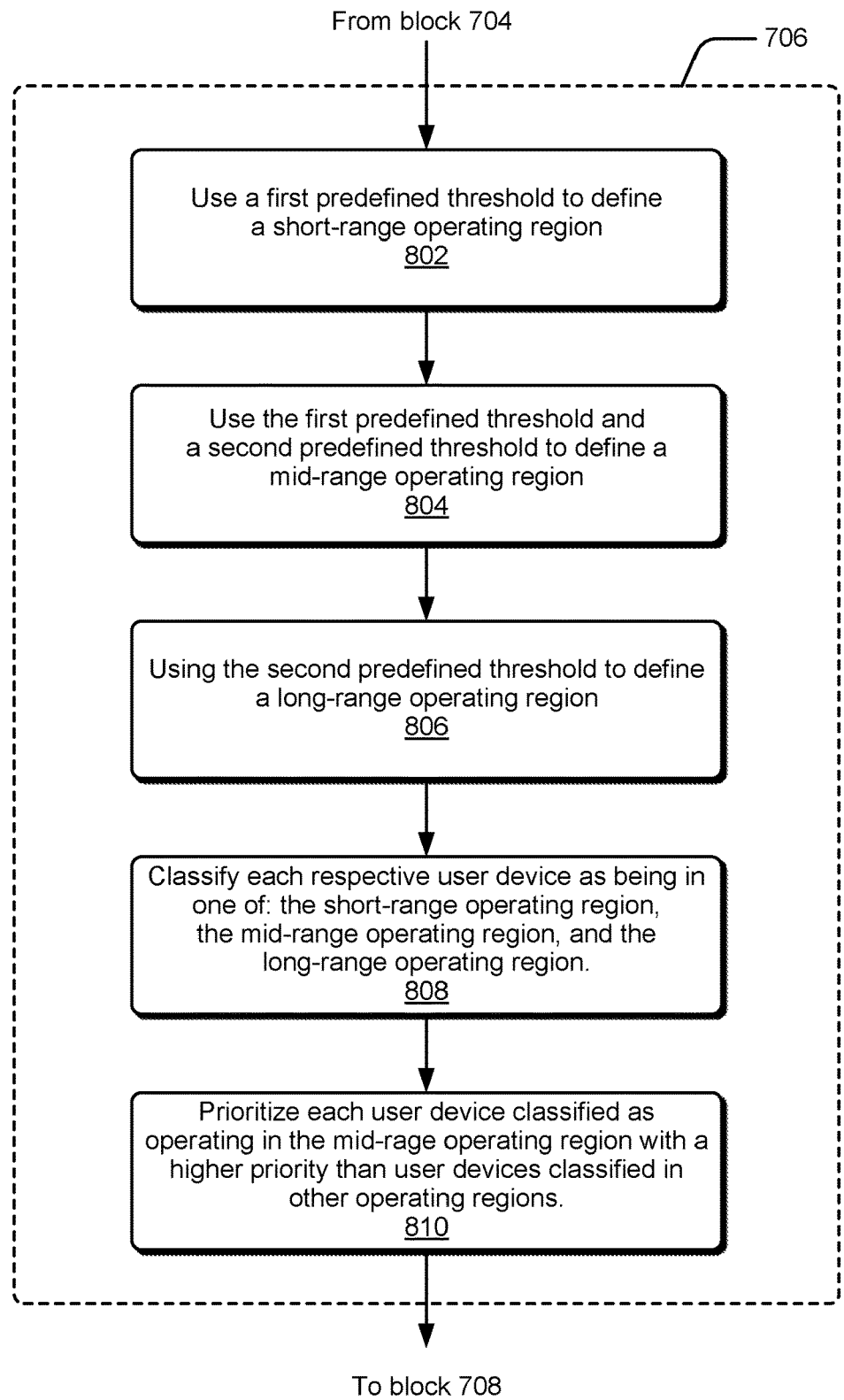
FIG. 8 is a flow diagram that illustrates example operations of prioritizing user devices for a beam-formed wireless connection in accordance with one or more embodiments.

FIG. 8 illustrates example operations that correspond to an expanded view of block 706 of FIG. 7. In this example, the wireless networking device reprioritizes a list of user devices by assigning each respective user device to a corresponding operating region. It is to be appreciated that FIG. 8 illustrates an example implementation of block 706 for discussion purposes, and that the wireless networking device can reprioritize a list of user devices using other methods without departing from the scope of the claimed subject matter At block 802, the wireless networking device uses a first predefined threshold to define a short-range operating region. The first predefined threshold can be associated with any suitable metric, such as an RSSI value, a distance value, and so forth. In some embodiments, user device metrics that fall at and/or below the first predefined threshold are considered to be operating in the short-range operating region At block 804, the wireless networking device uses the first predefined threshold and a second predefined threshold to define a mid-range operating region. Here, the second predefined threshold corresponds to a same unit type as that used for the first predefined threshold. Thus, if the first predefined threshold corresponds to an RSSI value, then the second predefine threshold corresponds to an RSSI value as well. In some embodiments, user device metrics that fall at and/or above the first predefined threshold and below the second predefined threshold are considered to be operating in the mid-range operating region.

At block 806, the wireless networking device uses the second predefined threshold to define a long-range operating region. In some embodiments, user device metrics that fall at and/or above the second predefined threshold are considered to be operating in the long-range operating region. It is to be appreciated that if a user device is considered to be operating in the long-range operating region (or other operating regions) if its corresponding metric is at the second predefined threshold, then the definition for a mid-range operating region are corresponding metrics that only fall below the second predefined threshold (and not at the second predefined threshold).

At block 808, the wireless networking device classifies each respective user device of the list of user devices as being in one of: the short-range operating region, the mid-range operating region, or the long-range operating region. For instance, in the example where the predefined thresholds correspond to an RSSI value, the wireless networking device compares the respective RSSI value for each respective user device to the first predefined threshold and/or the second predefined threshold. In turn, depending upon whether the respective RSSI value falls below, at, or above one of the predefined thresholds, the wireless networking device classifies the respective user device into a corresponding operating region.

At block 810, the wireless networking device prioritizes each user devices classified as operating in the mid-range operating region with a higher priority than user devices classified in other operating regions. In some embodiments, when the wireless networking devices classifies multiple user devices as operating in the mid-range operating region, the wireless networking device can use additional metrics to prioritize which user devices operating in the mid-range operating region have higher priority than other user devices operating in the mid-range operating region. Accordingly, some embodiments can use multiple metrics to prioritize user devices based upon their corresponding operating regions.

Figure 9:
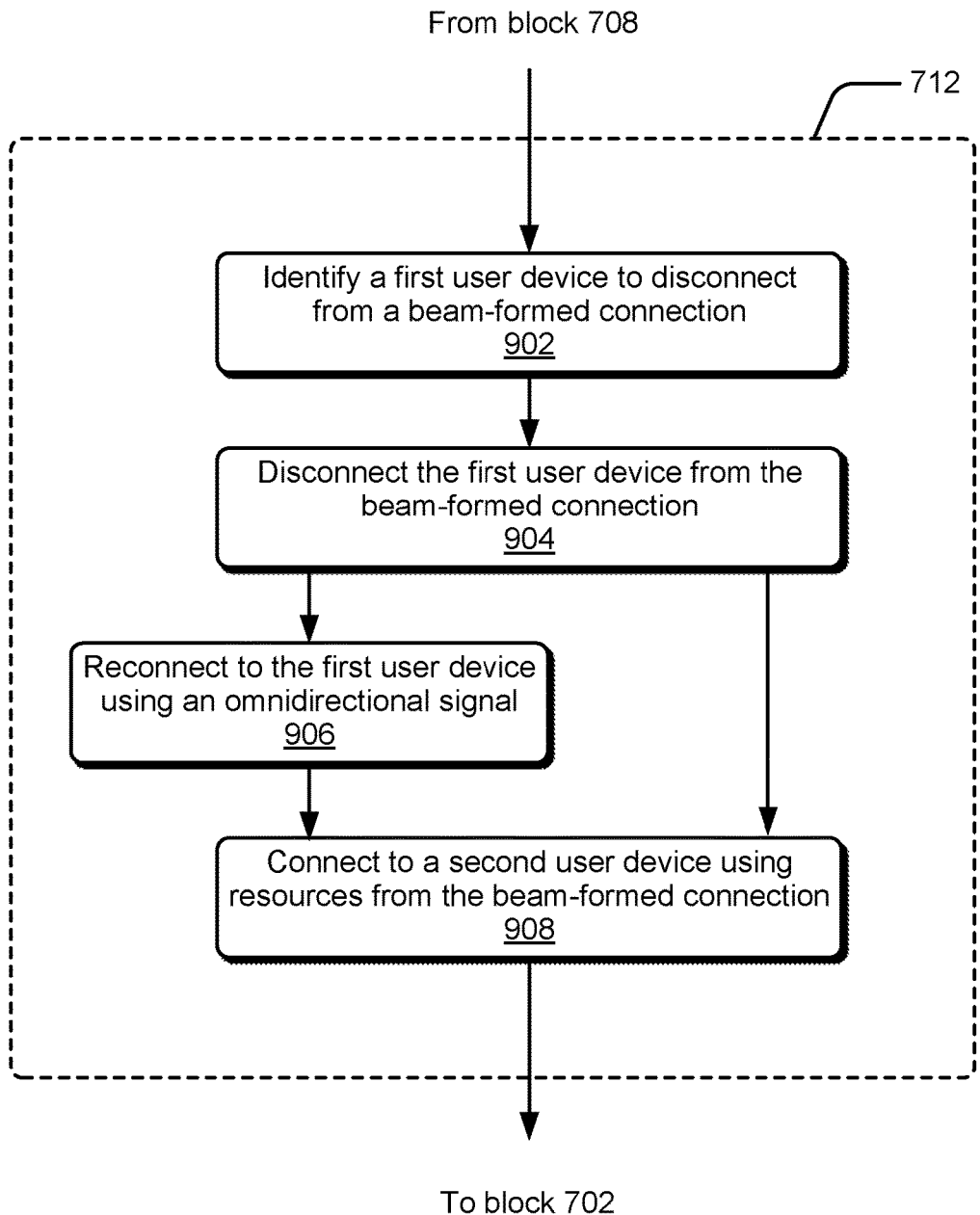
FIG. 9 is a flow diagram that illustrates example operations of dynamically reconfiguration a connectivity configuration associated with a wireless networking device in accordance with one or more embodiments.

Consider now FIG. 9 that includes an example flow diagram that corresponds to an expanded view of block 712 of FIG. 7. In this example, the wireless networking device reconfigures its current connectivity configuration by redirecting its resources from one user device to a second user device. It is to be appreciated that FIG. 9 describes an example implementation of block 712 for discussion purposes, and that the connectivity configuration associated with a wireless networking device can be reconfigured using other methods without departing from the scope of the claimed subject matter.

At block 902, the wireless networking device identifies a first user device to disconnect from a beam-formed signal connection to the wireless networking device. For example, the wireless networking device can analyze the prioritized list of user devices, and select the user device that is currently connected using a beam-formed signal connection and has the lowest priority relative to the other user devices using beam-formed signal connections. In turn, at block 904, the wireless networking device disconnects the first user device from the beam-formed signal connection. To achieve this, some embodiments send a DEAUTHentication (DE-AUTH) message to the first user device to indicate that a beam-formed signal connection service with the wireless networking device is no longer authorized and/or supported.

Optionally, at block 906, the wireless networking device reconnects to the first user device using an omnidirectional signal. In some embodiments, the first user device disables its beamforming capabilities and/or changes its operating state in order to connect to the wireless networking device via an omnidirectional signal. Alternately or additionally, the wireless networking device transmits a beacon over the omnidirectional signal it advertise its presence (over an omnidirectional signal connection) to the first user device.

At block 908, the wireless networking device connects to a second user device using a beam-formed signal connection. In some embodiments, the wireless networking device first disconnects the second user device from an omnidirectional signal connection, such as by transmitting a DEAUTH message to the second user device to indicate that the omnidirectional signal connection is no longer authorized. After disconnecting the second user device from the omnidirectional signal connection, the wireless networking device then reconnects with the second user device via a new beam-formed signal connection. Alternately or additionally the wireless networking device forms a new beam-formed signal connection to the second user device if the second user device is new to the wireless network supported by the wireless networking device.

By being able to dynamic configure its connectivity configuration, a wireless networking device can initiate changes to more optimally take advantage of its data throughput as its operating environment changes. For instance, the wireless networking device has visibility into which user devices are available, what connection capacity each user device has (e.g., beamforming connection capabilities and/or omnipresent connection capabilities), what data requests each user device may be running (e.g., WMM classifications), how well each user device receives data, and so forth. Based upon these various types of metrics, the wireless networking device can dynamically determine an optimal connectivity configuration that may best utilize its resources (e.g., data throughput), and dynamically initiate any changes to the connectivity configuration.

Having considered a discussion of dynamic connectivity configuration of a wireless networking device in accordance with one or more embodiments, consider now a discussion of a user device initiating connectivity configuration changes in accordance with one or more embodiments.

User Device Initiated Connectivity Configuration Changes

As further described herein, a wireless networking device has visibility into the various user devices associated with, and/or connected to, the wireless networking device. Based upon this global view, the wireless networking device can initiate changes to the various user devices to optimize its connectivity configuration to better utilize its available resources. For instance, by using beamforming and focusing more signal energy to a particular receiving device, the wireless networking device can improve a corresponding SNR, and subsequently increase or improve the transmitted data rates to that particular received device. By monitoring and analyzing the various metrics of the associated user devices and/or a corresponding operating environment, the wireless networking device can choose which user devices to communicate with via beamforming. However, the wireless networking device may not have visibility into the needs of the user device. In other words, the wireless networking device may establish a beam-formed signal connection with the user device, but the user device may have other preferences that drive its connectivity configuration.

Various embodiments provide connectivity configuration changes initiated by a user device. A user device determines its current connectivity configuration, such as whether the user device is currently connected to a wireless networking device and, if connected, what type of wireless connection type is being used. Upon determining its current connectivity configuration, the user device identifies one or more metrics associated with an operating environment and/or operating state of the user device, and analyzes the metrics with respect to the current connectivity configuration. For example, the user device can prioritize and/or weight the metrics according to default prioritization and/or user preferences as further described herein. In turn, the user device uses the prioritization and/or weighting of the metrics to identify changes to the current connectivity configuration of the user device, such as a change in a connection type to the wireless networking device, and subsequently make these modifications.

Consider an example in which a user device communicates with a wireless networking device using beamforming techniques. While these techniques provide the user device with additional data bandwidth, it comes at the tradeoff of faster battery drain relative to omnidirectional-based wireless communications. Subsequently, during these communications, the user device's battery level can transition from being above a predefined threshold level to being below the predefined threshold level. To preserve battery life, some embodiments of the user device initiate a change from a beam-formed signal connection with the wireless networking device to an omnidirectional signal connection as further described herein. For instance, the user device can transmitting a Spatial Multiplexing Power Save (SMPS) frame to the wireless networking device with a configuration that indicates the desired connection type and/or desired configuration, such as disabling a beam-formed signal connection. While discussed in the context of a battery level, the user device can identify and/or use other metrics as well.

To illustrate, consider another scenario in which the user device initiates a connection to the wireless networking device, such as during power up, moving within working range of the wireless networking device, after enabling Wi-Fi capabilities on the user device, and so forth. As part of the connection process, the user device can analyze various metrics, such as its RSSI, its battery level, data utilization associated with an application that has the current focus of the processor (and its corresponding WMM priority), and so forth. In turn, the user device can prioritize and/or weight each of these metrics as further described herein. Upon prioritizing the metrics, the user device can then determine a start-up connection type or mode that aligns best with the priorities of the user device relative to other connection types, and request this connection type when connecting to the wireless networking device. For instance, some embodiments configure or modify the Transmit Beamforming (TxBF) field in the associated connection request to reflect the connection type that best matches the user device's priorities. Thus, the user device can request a beam-formed signal connection, or disable beamforming, during the connection process to a wireless networking device.

When analyzing metrics, some embodiments prioritize and/or weight the various metrics to give more preference or significance when selecting a connection type for the user device. As an example, the user device can include default priorities that give more significance to metrics and/or connection types that preserve battery life relative to metrics and/or connection types that improve data throughput. In such an instance, the user device assigns a higher priority and or weighting to a battery level metric relative to a WMM voice data metric. Since the battery level is given higher priority than WMM voice data, the user device may initiate a change from using (or requesting) a beam-formed signal connection with a wireless networking device to using an omnidirectional signal connection with the wireless networking device. While this example is described in the context of comparing one weighted metric to another (e.g., battery level compared to WMM priority), some embodiments weight, combine, and/or analyze multiple metrics to determine when to initiate changes to the connectivity configuration.

A user device can also include user preferences that indicate priorities or weightings to assign to the various metrics. For example, a user may prefer data throughput to preserving battery life when conducing a voice or video call. In such an instance, the user can override default priorities and/or customize priorities to weight battery level metrics lower when conducting the voice or video call. The user can enter customized priorities in any suitable manner, such as through a user interface that allows a user to enter and save user preferences, in either a single user profile, or multiple user profiles. Thus, the user can enter customized priorities based upon a location, which wireless networking device is associated with the user device, which applications are running, and so for. To illustrate, a user device can have a first set of customized priorities when connecting with a home networking device, a second set of customized priorities when connecting with a work networking device, a third set of customized priorities for connecting with a public networking device, and so forth. Then, as the user device moves from location to location, it first identifies which location it is at (such as through the use of Global Positioning System (GPS) information, which wireless networking device it is currently within working range of, etc.), and subsequently obtain the corresponding user preferences for that location (e.g., location-based user preferences).

While a user device can use location metrics, active application metrics data utilization metrics, and/or battery level metrics to determine its corresponding connectivity configuration with a wireless networking device, other metrics are available as well. For instance, consider RSSI. A user device can use RSSI to identify when it is operating in a short-range region, a mid-range region, or a long-range region relative to corresponding wireless networking device as further described herein. In turn, the user device can determine when to switch from a beam-formed signal connection, or to a beam-formed signal connection, based upon a corresponding RSSI. Alternately or additionally, the user device can base reconfiguring its connectivity connection based PER and/or BER. As another example, the user device can request a beam-formed signal connection to the user device after identifying that the corresponding environment includes a lot of residual RF noise, such as RF noise from neighboring wireless networking devices and/or user devices. In such an instance, the user device can identify when a change in its RF environment has occurred, such as by identifying when the RF noise it its environment has exceeded a predefined threshold, and subsequently request a beam-formed signal connection to reduce additional RF noise in the environment and boost its received signal strength.

Figure 10:
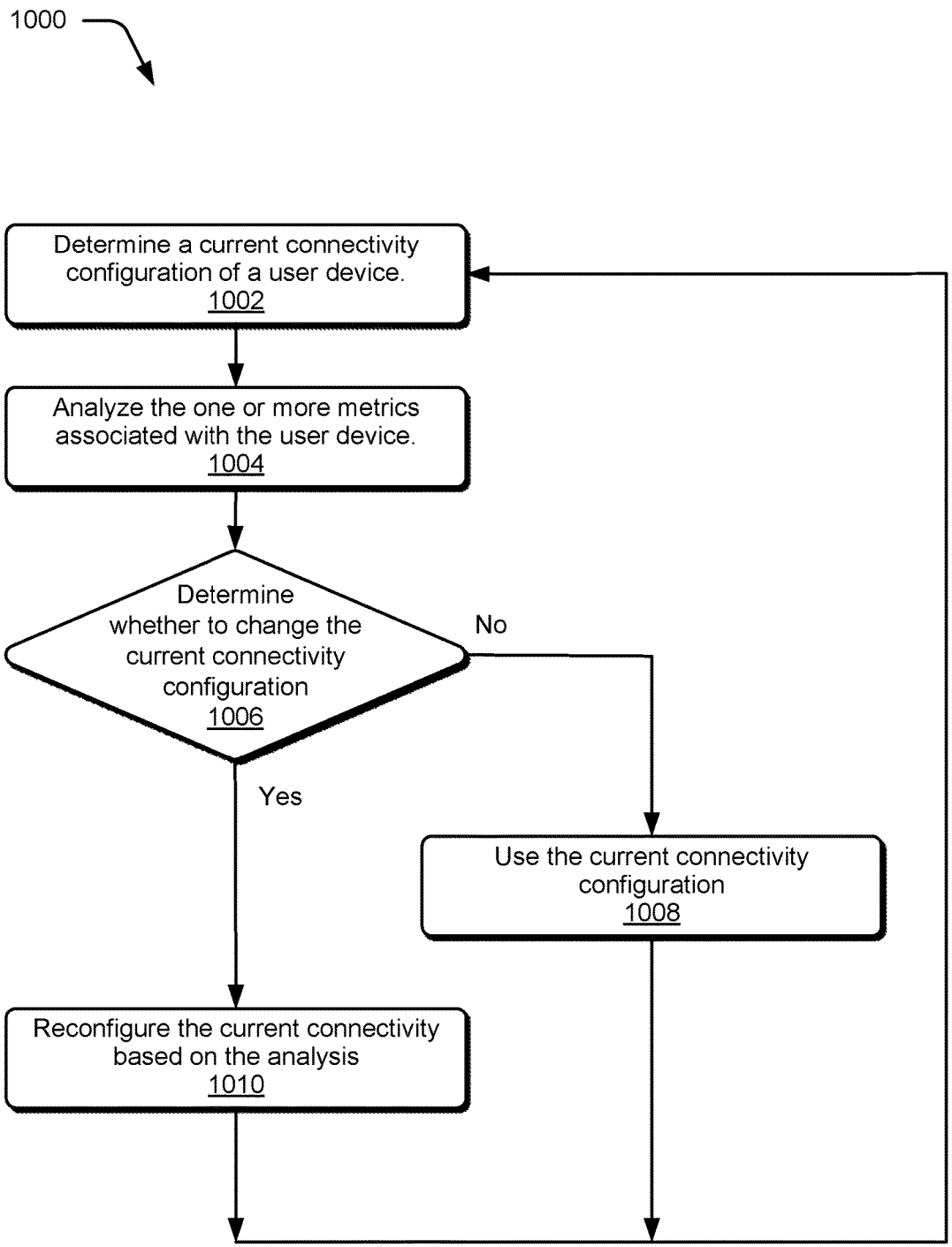
FIG. 10 is a flow diagram that illustrates operations of dynamically initiating alterations to a wireless connection type by a user device in accordance with one or more embodiments.

FIG. 10 illustrates an example method 1000 that dynamically reconfigures the connectivity configuration of a user device in accordance with one or more embodiments. Generally, any services, components, modules, methods, and/or operations described herein can be implemented using software, firmware, hardware (e.g., fixed logic circuitry), manual processing, or any combination thereof. For instance, method 1000 can be performed by user connectivity management module 114 of FIG. 1. Some operations of the example methods may be described in the general context of executable instructions stored on computer-readable storage memory that is local and/or remote to a computer processing system, and implementations can include software applications, programs, functions, and the like. Alternately or in addition, any of the functionality described herein can be performed, at least in part, by any combination of hardware, software and/or firmware. While method 1000 illustrates steps in a particular order, it is to be appreciated that any specific order or hierarchy of the steps described here is used to illustrate an example of a sample approach. Other approaches may be used that rearrange the ordering of these steps. Thus, the order steps described here may be rearranged, and the illustrated ordering of these steps is not intended to be limiting.

At block 1002, the user device determines a current connectivity configuration of the user device. The current connectivity configuration can include a single connectivity configuration parameter, or a combination of multiple connectivity configuration parameters, such as Wi-Fi enablement, type of connection to a wireless networking device, and so forth. As an example of multiple configuration parameters, the user device can first determine whether the user device has Wi-Fi functionality enabled and, if the Wi-Fi functionality is enabled, whether it is connected to the wireless networking device or not. Alternately or additionally, the user device can identify whether the user device is connected to the wireless networking device using a beam-formed signal connection or an omnidirectional signal connection.

Responsive to determining the current connectivity configuration, the user device analyzes one or more metrics associated with the user device at block 1004. For instance, some embodiments analyze an RSSI value (associated with a communication channel between the user device and wireless networking device) by comparing it to a predefined RSSI threshold (regardless of whether the user device is already connected, or is about to connect, to the wireless networking device). Any suitable number can be used for the predefined RSSI threshold, such as −75 decibels (dB). Alternately or additionally, the user device can analyze a currently battery level by comparing it to a predefined battery level threshold, such as how much battery life is left (e.g., 15% battery life left, 20% battery life left, 10% battery life left, etc.). However, any other suitably types of metrics can be analyzed, such as what applications are currently running on the user device, what their respective WMM priorities are, what type of RF environment the user device is operating in, and so forth. As part of the analyzing, some embodiments apply a respective weighting to each metric and/or prioritize the metrics, such as by using a default prioritization or a user-defined prioritization as further described herein. In some embodiments, the analysis includes comparing the current connectivity configuration and/or metrics based upon and/or applying user preferences as further described herein. In some embodiments, as part of its analysis of the various metrics, the user device identifies its operating region in relation to a corresponding wireless networking device (e.g., short-range operating region, mid-range operating region, long-range operating region), and bases its connectivity configuration on a corresponding operating region as further described herein.

At block 1006, the user device determines whether to change the current connectivity configuration based on the analysis. For example, if the RSSI value falls below the predefined RSSI threshold (e.g., the RSSI value indicates a weak signal), the user device may determine to change the current connectivity configuration from a beam-formed signal connection to a different connection type in order free up resources associated with beamforming techniques for another device. As another example, if the battery life falls below the predetermined battery threshold, the user device can also determine to change its current connectivity configuration from a beam-formed signal connection to a different type of connection type in order to save battery life. If the user device determines that the current connectivity configuration aligns with its current priorities (e.g., no changes are necessary), the user device uses the current connectivity configuration at block 1008. In turn, the method returns to block 1002 to continue monitoring the current connectivity configuration of the user device to determine when new changes have occurred. However, if the user device determines to change the current connectivity configuration, the method proceeds to block 1010.

At block 1010, the user device reconfigures and/or initiates changes to the current connectivity based on the analysis. For instance, the user device can dynamically modify its connection type to the wireless networking device by updating the fields an SMPS message to reflect the connection type change, and then transmitting an SMPS message to the wireless networking device. This allows the user device to respond to operating changes in its environment by modifying its connection type. As another example, when beginning a connection process to the wireless networking device, the user device can dynamically request a connection type in the TxBF field of the corresponding connection request. Responsive to reconfiguring the current connectivity, the method returns to block 1002 to continue monitoring the current connectivity configuration of the user device to identify when changes have occurred.

By dynamically initiating changes to its connectivity configuration to a wireless networking device, a user device can dynamically preserve its resources during operation. This allows the user device to determine which connection type into a wireless networking device best suits its current operating state as the operating state changes, and make modifications dynamically in response to these changes. For instance, the user device can determine, as the focus of the current application changes, that it does not need the high bandwidth as provided by a beam-formed signal connection. In turn, the user device can request an omnidirectional signal connection to allow other user devices to benefit from a beam-formed signal connection. In a similar manner, the user device can preserve its battery life by switching from a beam-formed signal connection to an omnidirectional signal. Alternately or additionally, the user device can identify when a beam-formed connection would better serve its current operating state, and respond accordingly.

Having considered a discussion of a user device dynamically initiating changes to a corresponding connectivity configuration to a wireless networking device in accordance with one or more embodiments, consider now example computing devices that can implement the various embodiments described above.

Example Devices

Figure 11:
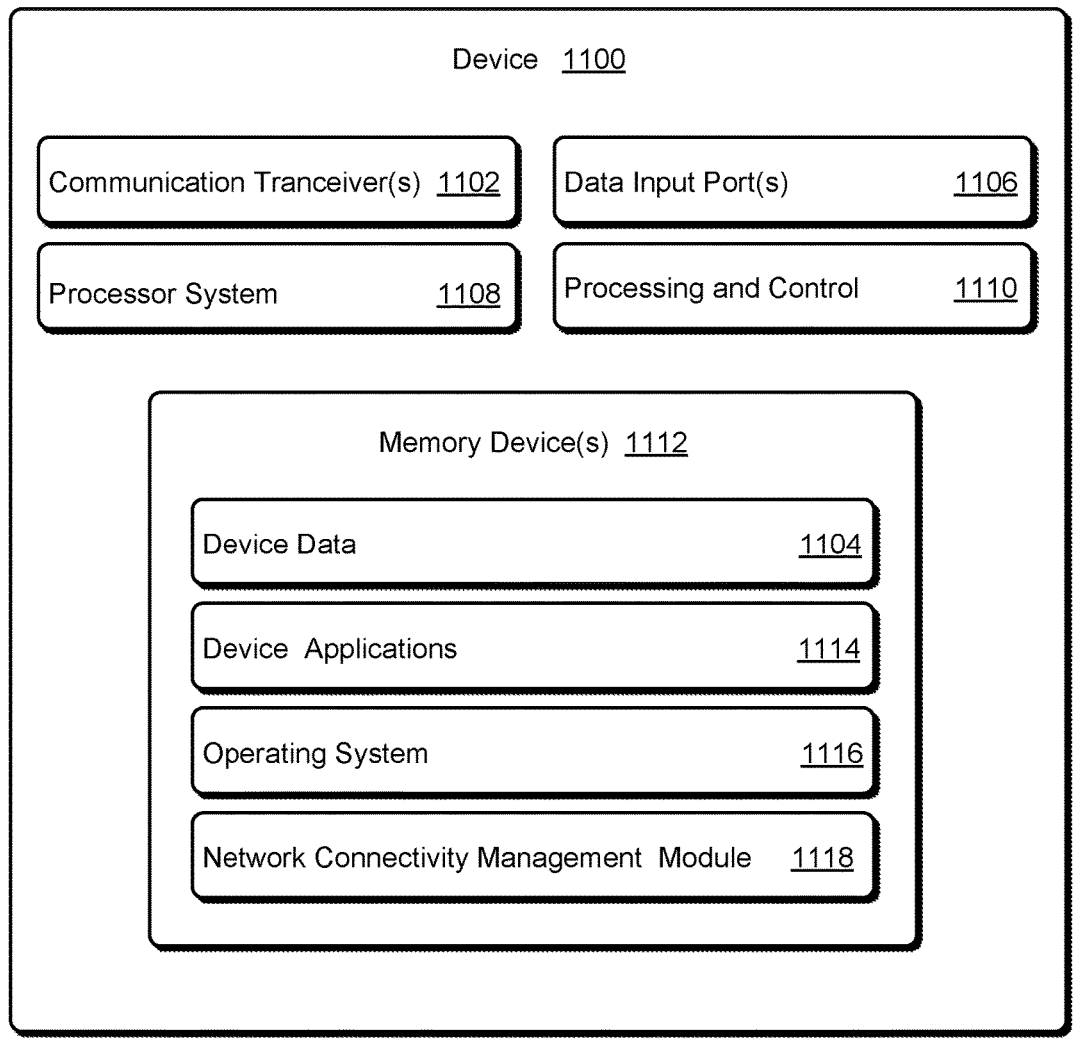
FIG. 11 illustrates various components of an example device that can implement various embodiments.
Figure 12:
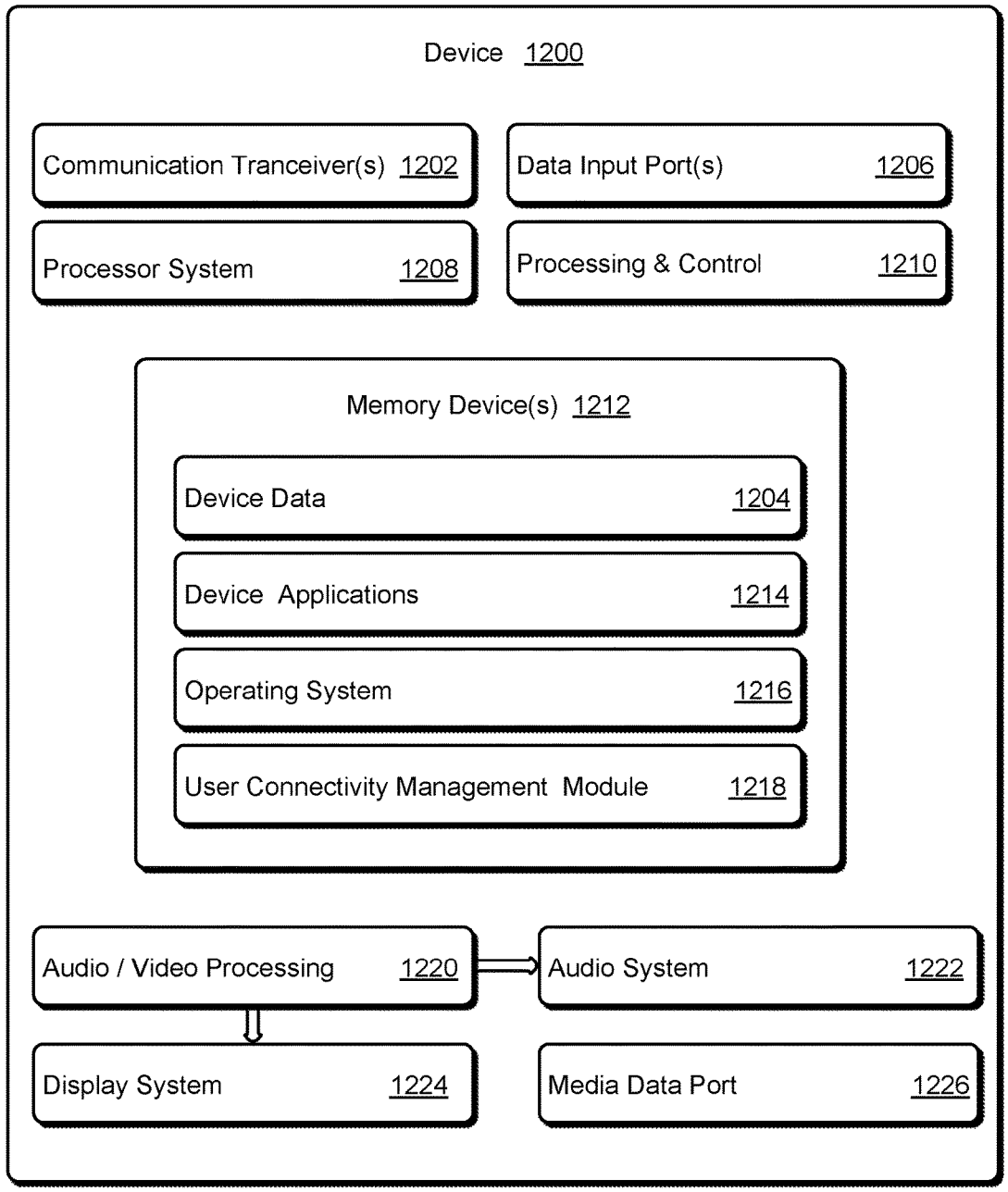
FIG. 12 illustrates various components of an example device that can implement various embodiments.

FIG. 11 illustrates various components of an example device 1100 in which dynamic connectivity configuration of a wireless networking device can be implemented, while FIG. 12 illustrates various components of an example device 1200 in which user device-initiated connectivity configuration can be implemented. In some embodiments, electronic device 1100 and electronic device 1200 have at least some similar components. Accordingly, for the purposes of brevity, FIG. 11 and FIG. 12 will be described together. Similar components associated with FIG. 11 will be identified as components having a naming convention of "11XX", while components associated with FIG. 12 will be identified as components having a naming convention of "12XX". Conversely, components distinct to each device will be described separately and after the similar components. Electronic device 1100 and electronic device 1200 can be, or include, many different types of devices capable of implementing dynamic connectivity configuration of a wireless networking device and/or user device-initiated connectivity configuration in accordance with one or more embodiments.

Electronic device 1100/electronic device 1200 includes communication transceivers 1102/communication transceivers 1202 that enable wired or wireless communication of device data 1104/device data 1204, such as received data and transmitted data. While referred to as a transceiver, it is to be appreciated that communication transceivers 1102/communication transceivers 1202 can additionally include multiple antennas that can be configured differently from one another, or work in concert to generate beam-formed signals. For example, a first antenna can transmit/receive omnidirectional signals, and subsequent antennas transmit/receive beam-formed signals. Example communication transceivers include Wireless Personal Area Network (WPAN) radios compliant with various Institute of Electrical and Electronics Engineers (IEEE) 802.15 (Bluetooth™) standards, Wireless Local Area Network (WLAN) radios compliant with any of the various IEEE 802.11 (WiFi™) standards, Wireless Wide Area Network (WWAN) radios for cellular telephony (3GPP-compliant), wireless metropolitan area network radios compliant with various IEEE 802.16 (WiMAX™) standards, and wired Local Area Network (LAN) Ethernet transceivers.

Electronic device 1100/electronic device 1200 may also include one or more data input ports 1106/data input ports 1206 via which any type of data, media content, and/or inputs can be received, such as user-selectable inputs to the device, messages, music, television content, recorded content, and any other type of audio, video, and/or image data received from any content and/or data source. The data input ports may include Universal Serial Bus (USB ports), coaxial cable ports, and other serial or parallel connectors (including internal connectors) for flash memory, Digital Versatile Discs (DVDs), Compact Discs (CDs), and the like. These data input ports may be used to couple the device to any type of components, peripherals, or accessories such as microphones, cameras, and/or modular attachments.

Electronic device 1100/electronic device 1200 includes a processing system 1108/processing system 1208 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively, or in addition, the device can be implemented with any one or combination of software, hardware, firmware, or fixed logic circuitry that is implemented in connection with processing and control circuits, which are generally identified as processing and control 1110/processing and control 1210. Electronic device 1100/electronic device 1200 may further include any type of a system bus or other data and command transfer system that couples the various components within the device. A system bus can include any one or combination of different bus structures and architectures, as well as control and data lines.

Electronic device 1100/electronic device 1200 also includes computer-readable storage memory or memory devices 1112/memory devices 1212 that enable data storage, such as data storage devices that can be accessed by a computing device, and that provide persistent storage of data and executable instructions (e.g., software applications, programs, functions, and the like). Examples of the computer-readable storage memory or memory devices 1112/memory devices 1212 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. Electronic device 1100/electronic device 1200 may also include a mass storage media device.

The computer-readable storage memory provides data storage mechanisms to store the device data 1104/device data 1204, other types of information and/or data, and various device applications 1114/device applications 1214 (e.g., software applications). For example, an operating system 1116/operating system 1216 can be maintained as software instructions with a memory device and executed by the processing system 1108/processing system 1208. The device applications may also include a device manager, such as any form of a control application, software application, signal-processing and control module, code that is native to a particular device, a hardware abstraction layer for a particular device, and so on. Electronic device 1100 includes network connectivity management module 1118, while electronic device 1200 includes user connectivity management module 1218.

Network connectivity management module 1118 manages the connectivity configuration of electronic device 1100. For instance, network connectivity management module 1118 determines which user devices connect to electronic device 1100 using beam-formed signal connections, and which user devices connect to electronic device 1100 using omnidirectional signal connections. In turn, network connectivity management module 1118 can manage various aspects of communication transceiver(s) 1102 to direct which communication signals are transmitted to which user devices. Some embodiments of network connectivity management module 1118 dynamically prioritize various user devices to identify which user devices would better utilize a beam-formed signal connection relative to other user devices. Network connectivity management module 1118 can then analyze a current connectivity configuration of electronic device 1100 to determine if it matches and/or aligns with the prioritized list of user devices. If the current connectivity configuration differs from the prioritized list of user devices, some embodiments of network connectivity management module 1118 initiate and/or dynamically reconfigure individual wireless connections of selected user devices to align the current connectivity configuration with the prioritized.

User connectivity management module 1218 manages the connectivity configuration of electronic device 1200. User connectivity management module 1218 can analyze various metrics associated with electronic device 1200, and determine whether to dynamically reconfigure its connectivity configuration as further described herein.

Electronic device 1200 also includes an audio and/or video processing system 1220 that generates audio data for an audio system 1222 and/or generates display data for a display system 1224.

The audio system 1222 and/or the display system 1224 may include any devices that process, display, and/or otherwise render audio, video, display, and/or image data. Display data and audio signals can be communicated to an audio component and/or to a display component via an RF link, S-video link, HDMI (high-definition multimedia interface), composite video link, component video link, DVI (digital video interface), analog audio connection, or other similar communication link, such as media data port 1226. In implementations, the audio system and/or the display system are integrated components of the example device. Alternatively, the audio system and/or the display system are external, peripheral components to the example device.

CONCLUSION

Various embodiments provide a user device that dynamically initiates a change to its connectivity configuration. Some embodiments of the user device determine its current connectivity configuration and, based upon its current connectivity configuration, obtains one or more metrics associated with its current operating environment and/or current operating configuration. In turn, the user devices analyzes the metrics to determine whether to alter its current connectivity configuration. Responsive to the analysis, some embodiments modify the current connectivity configuration by modifying a connection type to a wireless networking device.

Although various aspects of dynamic connectivity reconfiguration have been described in language specific to features and/or methods, the subject of the appended claims is not necessarily limited to the specific features or methods described. Rather, the specific features and methods are disclosed as example implementations, and other equivalent features and methods are intended to be within the scope of the appended claims. Further, various different embodiments are described and it is to be appreciated that each described embodiment can be implemented independently or in connection with one or more other described embodiments.

We claim:

1. A user device comprising:
one or more processors; and
computer-readable storage devices comprising processor-executable instructions which, responsive to execution by the one or more processors, enable the user device to perform operations comprising:
  determining a current connectivity configuration associated with the user device and a wireless networking device;
  analyzing one or more metrics associated with the user device;
  determining, based, at least in part, on said analyzing the one or more metrics, whether to change the current connectivity configuration of the user device; and
  responsive to an additional user device that has a beam-formed signal connection with the wireless networking device being disconnected from the wireless networking device and determining to change the current connectivity configuration, reconfiguring, with the user device, the current connectivity configuration by changing a connection type associated with the user device and the wireless networking device to include the beam-formed signal connection.

2. The user device as recited in claim 1, wherein said determining the current connectivity configuration comprises determining whether the user device has Wireless Local Area Network (Wi-Fi) functionality enabled.

3. The user device as recited in claim 2 further comprising:
responsive to determining that the user device has Wi-Fi functionality enabled, determining whether the user device is connected to the wireless networking device.

4. The user device as recited in claim 1, wherein said analyzing the one or more metrics further comprises comparing the one or more metrics to a respective predefined threshold, the one or more metrics comprising at least one of:
  a round-trip-time (RTT) metric;
  a Bit Error Rate (BER) metric;
  a Packet Error Rate (PER) metric; or
  a Received Signal Strength Indicator (RSSI) metric.

5. The user device as recited in claim 1, wherein said reconfiguring the current connectivity configuration further comprises:
  determining the user device is currently connected to the wireless networking device via the beam-formed signal connection; and
  transmitting a Spatial Multiplexing Power Save (SMPS) frame to the wireless networking device with a configuration that indicates to disable the beam-formed signal connection.

6. The user device as recited in claim 1, wherein said analyzing one or more metrics further comprises:
  identifying location-based user preferences associated with the one or more metrics to prioritize the one or more metrics; and
  applying the location-based user preferences to the one or more metrics during said analyzing.

7. The user device as recited in claim 1, wherein said analyzing the one or more metrics further comprises weighting each metric of the one or more metrics.

8. The user device as recited in claim 7, wherein said weighting each metric further comprises weighting each metric based upon a location associated with the user device.

9. A computer-implemented method comprising:
  determining, using a user device, a connectivity configuration associated with the user device by determining a connection type associated with a wireless communication link between the user device and a wireless networking device;
  analyzing an operating state associated with the user device to determine whether to change the connection type;
  responsive to determining to change the connection type, starting a timer;
  responsive to expiration of the timer, verifying the operating state has not changed; and
  responsive to the verifying, dynamically reconfiguring the connectivity configuration to modify how the user device communicates with the wireless networking device by changing the connection type.

10. The computer-implemented method of claim 9, wherein said analyzing the operating state further comprises identifying a battery level associated with the user device has dropped below a predefined threshold.

11. The computer-implemented method of claim 9, wherein said changing the connection type further comprises changing the connection type from a beam-formed signal connection to an omnidirectional signal connection.

12. The computer-implemented method of claim 9, wherein said analyzing the operating state further comprises identifying a change in data utilization associated with the user device.

13. The computer-implemented method of claim 9, wherein said analyzing the operating state further comprises identifying a change in an associated radio frequency (RF) environment.

14. The computer-implemented method of claim 13, wherein said dynamically initiating the change to the connection type further comprises changing the connection type to a beam-formed signal connection.

15. The computer-implemented method of claim 9, wherein said dynamically initiating the change to the connection type further comprises:
  modifying a Transmit Beamforming (TxBF) field in a connection request to the wireless networking device to reflect the change in the connection type; and
  transmitting the connection request to the wireless networking device.

16. The computer-implemented method of claim 9 further comprising:

identifying a location associated with the user device;
obtaining user preferences associated with the location; and
performing said analyzing based, at least in part, on the user preferences.

17. A user device comprising:
one or more processors; and
computer-readable storage devices comprising processor-executable instructions which, responsive to execution by the one or more processors, enable the user device to perform operations comprising:
   determining, with the user device, a connectivity configuration associated with the user device by identifying a connection type associated with a wireless communication link between the user device and a wireless networking device;
   determining whether to change the connection type by analyzing an operating state associated with the user device, the analyzing including determining whether the user device is operating in a mid-range operating region relative to the wireless networking device, the mid-range operating region being prioritized higher than a short-range operating region and a long-range operating region; and
   responsive to determining to change the connection type, modifying the connection by sending one or more messages to the wireless networking device to dynamically reconfigure the wireless communication link.

18. The user device as recited in claim 17, wherein said determining whether to change the connection type is based, at least in part, on:
   identifying if the user device is currently connected to the wireless networking device;
   identifying the connection type associated with the communication link;
   identifying a battery level associated with the user device;
   identifying a Received Signal Strength Indicator (RSSI) value associated with the communication link; and
   identifying a data utilization associated with a current application with priority on the user device.

19. The user device as recited in claim 18, wherein said determining whether to change the connection type further comprises:
   determining that the battery level has dropped below a predefined battery level threshold;
   determining that the data utilization has a Wireless MultiMedia (WMM) prioritization associated with VOice (VO) data; and
   prioritizing a connection type associated with the battery level over a connection type associated with the data utilization.

20. The user device as recited in claim 17, wherein said determining whether to change the connection type further comprises determining an amount of interference from an overlapping beam of an additional wireless networking device.

* * * * *